(12) United States Patent
Ueno et al.

(10) Patent No.: US 9,170,472 B2
(45) Date of Patent: Oct. 27, 2015

(54) PORTABLE PHOTOGRAPHING DEVICE

(75) Inventors: Yasuhiro Ueno, Yokohama (JP);
Yasushi Kitamura, Yokohama (JP);
Masatsugu Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 711 days.

(21) Appl. No.: 13/504,266

(22) PCT Filed: Oct. 22, 2010

(86) PCT No.: PCT/JP2010/068710
§ 371 (c)(1),
(2), (4) Date: Apr. 26, 2012

(87) PCT Pub. No.: WO2011/052506
PCT Pub. Date: May 5, 2011

(65) Prior Publication Data
US 2012/0212647 A1   Aug. 23, 2012

(30) Foreign Application Priority Data

Oct. 28, 2009   (JP) .................................. 2009-248218

(51) Int. Cl.
*G03B 21/14* (2006.01)
*G03B 17/54* (2006.01)
(Continued)

(52) U.S. Cl.
CPC ............ *G03B 17/54* (2013.01); *H04N 1/00307* (2013.01); *H04N 5/23293* (2013.01); *H04N 5/2621* (2013.01); *H04N 5/272* (2013.01); *H04N 9/3176* (2013.01); *H04M 1/0264* (2013.01); *H04M 1/0272* (2013.01); *H04M 1/0279* (2013.01)

(58) Field of Classification Search
CPC . H04N 9/3176; H04M 1/0279; H04M 1/0264
USPC .................................................. 353/121, 122
See application file for complete search history.

(56) References Cited

U.S. PATENT DOCUMENTS 7,016,711 B2    3/2006  Kurakane
7,234,819 B2 *  6/2007  Nonaka et al. .................. 353/69
(Continued)

FOREIGN PATENT DOCUMENTS

JP    2003152851 A    5/2003
JP    2006080875 A    3/2006
(Continued)

OTHER PUBLICATIONS

International Search Report and Written Opinion for PCT/JP2010/068710, dated Jan. 11, 2011.

*Primary Examiner* — William C Dowling
(74) *Attorney, Agent, or Firm* — Hauptman Ham, LLP

(57) ABSTRACT

According to an aspect, a portable photographing device includes: an image capturing unit; a projecting unit for projecting an image; and a storing unit for storing an image captured by the image capturing unit. The projecting unit projects any of a first image captured by the image capturing unit, a second image related to the first image, and a third image obtained by synthesizing the first image with the second image as a projection image into a region which is different from an image capturing region of the photographing unit. The storing unit stores the first image in the projection of the projection image or the first image after the projection of the projection image.

10 Claims, 18 Drawing Sheets

(51) Int. Cl.

| | | |
|---|---|---|
| *H04N 1/00* | (2006.01) | |
| *H04N 5/232* | (2006.01) | |
| *H04N 5/262* | (2006.01) | |
| *H04N 5/272* | (2006.01) | |
| *H04N 9/31* | (2006.01) | |
| *H04M 1/02* | (2006.01) | |

(56) References Cited

U.S. PATENT DOCUMENTS 7,798,656 B2 *   9/2010   Nozaki et al. ................. 353/100
2008/0001916 A1 *   1/2008   Nozaki et al. ................. 345/156
2009/0033785 A1 *   2/2009   Fujinawa et al. ........ 348/333.01
2011/0075102 A1 *   3/2011   Nozaki et al. .................... 353/30
2012/0165077 A1 *   6/2012   Ueno et al. ..................... 455/566

FOREIGN PATENT DOCUMENTS

| JP | 2006197369 A | 7/2006 |
| JP | 2008134452 A | 6/2008 |
| JP | 2008298819 A | 12/2008 |
| JP | 2009033544 A | 2/2009 |

* cited by examiner

PORTABLE PHOTOGRAPHING DEVICE

CROSS-REFERENCE TO RELATED APPLICATION

This application is a National Stage of PCT international application Ser. No. PCT/JP2010/068710 filed on Oct. 22, 2010, and which is based upon and claims the benefit of priority from Japanese Patent Application No. 2009-248218, filed on Oct. 28, 2009.

FIELD

The present disclosure relates to a portable photographing device having a projector function for projecting an image and a photographing function for photographing an image.

BACKGROUND

A portable photographing device for photographing an image includes a digital camera, a digital video camera and the like. A device for projecting an image onto a wall surface or a screen includes a so-called projector. As the projector, a device of a so-called stationary type is a mainstream, in which a power is supplied from a commercial power supply thereto and the device is used in a fixing state into a predetermined position. The projector of the stationary alone type projects an image onto a wall surface or a screen in a certain place in the fixing state. On the other hand, in recent years, a portable projector which is small-sized and is easy to carry is proposed as the projector.

Patent Literature 1 describes a portable electronic apparatus having an image capturing function and a projector function, including an photographing device for picking up a subject image and outputting an image signal, a projector device for projecting an image formed on a light image forming element, image change detecting means for detecting a change in the image signal, indicating means for giving an instruction related to an operation of the projector device corresponding to a region in which the change in the image signal is detected, a display device capable of displaying an image obtained by pickup of the photographing device, and display control means for controlling a display content to be displayed on the display device and causing the display device to carry out a display corresponding to the instruction.

Furthermore, Patent Literature 2 describes a portable terminal device for projecting an image onto a touch panel or a key button by means of a projector. The portable terminal device described in the Patent Literature 2 projects a character, a numeral, a mark or the like which is allocated to each portion of the touch panel in the case of an input mode.

CITATION LIST

Patent Literature

Patent Literature 1: Japanese Patent Application Laid-Open No. 2008-298819
Patent Literature 2: Japanese Patent Application Laid-Open No. 2003-152851

Technical Problem

In some cases in which an image is captured by a portable photographing device, the portable photographing device is fixed by means of a tripod or the like and a release timer, a remote control or the like is used to photograph a photographer himself (herself) as a subject. In the case in which the photographer himself (herself) is also set as the subject to photograph an image, thus, a state of an angle background can be regulated to some degree as is intended by himself (herself). However, it is impossible to confirm a condition in which the photographer himself (herself) is photographed with respect to the angle. For this reason, a positional relationship between the background and the photographer himself (herself) cannot be photographed in a desirable position or at an intended angle in some cases. In order to photograph a desired image, therefore, it is necessary to repeat an action for photographing an image and an action for confirming the image, thereby regulating a standing position, photographic setting or the like.

For the foregoing reasons, there is a need for a portable photographing device capable of photographing a desired image by a person to be a subject more easily.

SUMMARY

According to an aspect, according to the present invention, a portable photographing device includes: an image capturing unit; a projecting unit for projecting an image; and a storing unit for storing an image captured by the image capturing unit. The projecting unit projects any of a first image captured by the image capturing unit, a second image related to the first image, and a third image obtained by synthesizing the first image with the second image as a projection image into a region which is different from an image capturing region of the photographing unit. The storing unit stores the first image in the projection of the projection image or the first image after the projection of the projection image.

According to an aspect, the projecting unit projects the projection image into a region in which a person serving as a subject to be photographed by the image capturing unit can visually recognize the projection image from the image capturing region.

According to an aspect, the portable photographing device further includes: a display unit for displaying an identical image to an image to be projected by the projecting unit; and an operating unit for inputting an operation for specifying a position in the image displayed on the display unit. The second image is an image indicative of a specific position which is specified by the operation input to the operating unit.

According to an aspect, the image indicative of the specific position suggests a position of a person to be a subject in the image capturing.

According to an aspect, the second image includes an image indicative of information related to a control of the image capturing.

According to an aspect, the storing unit stores, if the image capturing unit decides that a number of subjects, an operation of the subject, and a position of the subject satisfy a preset condition, the first image acquired when the preset condition is satisfied or after the preset condition is satisfied.

According to an aspect, the storing unit stores, if the image capturing unit detects that a relationship between the person serving as the subject and the specific position satisfies a preset condition, the first image acquired when the preset condition is satisfied or thereafter.

According to an aspect, the projecting unit projects an image into a position in which a portion of the projection image overlaps with the image capturing region, and the storing unit stops the projection of the projection image through the projecting unit and then stores the first image at the time of the stop of the projection of the image or thereafter if the image capturing unit detects that a number of subjects, an operation of the subject, or a position of the subject satisfies a preset condition in a region in which the projection image overlaps with the image capturing region.

According to an aspect, the overlapping region is provided under the subject or in the vicinity thereof.

According to an aspect, the projecting unit displays a mark for giving an instruction related to an image capturing in the overlapping region, and the storing unit stores, if the image capturing unit detects that a preset operation is carried out for the mark by a person to be the subject, the first image acquired at the time of a detection of the preset operation or thereafter.

According to an aspect, a portable photographing device includes: an image capturing unit; a projecting unit for projecting an image; and a storing unit for storing an image captured up by the image capturing unit. The projecting unit projects a third image obtained by synthesizing a first image captured by the image capturing unit and a prestored second image, as a projection image, into a region which is different from an image capturing region of the photographing unit. The storing unit stores the third image acquired when the projection image is projected or the third image acquired after the projection of the projection image.

Advantageous Effects of Invention

According to the present invention, it is possible to obtain an effect that a photographing operation can be carried out while a person to be a subject confirms an image, and the person to be the subject can easily photograph a desired image.

DESCRIPTION OF EMBODIMENT

The present invention will be described below in detail with reference to the drawings. The present invention is not limited to the following description. Moreover, components in the following description include components which can easily be supposed by the skilled in the art, substantially identical components, and components within a so-called equivalent range. Although a mobile phone including a projector and a camera will be taken as an example of a portable photographing device (a portable electronic device having a projector function and an image capturing function), an application target of the present invention is not limited to the mobile phone. The portable photographing device can also be applied to PHSs (Personal Handy-phone Systems), PDAs, portable navigation devices, notebook computers, gaming devices, digital cameras, digital video cameras and the like, for example.

Figure 1:
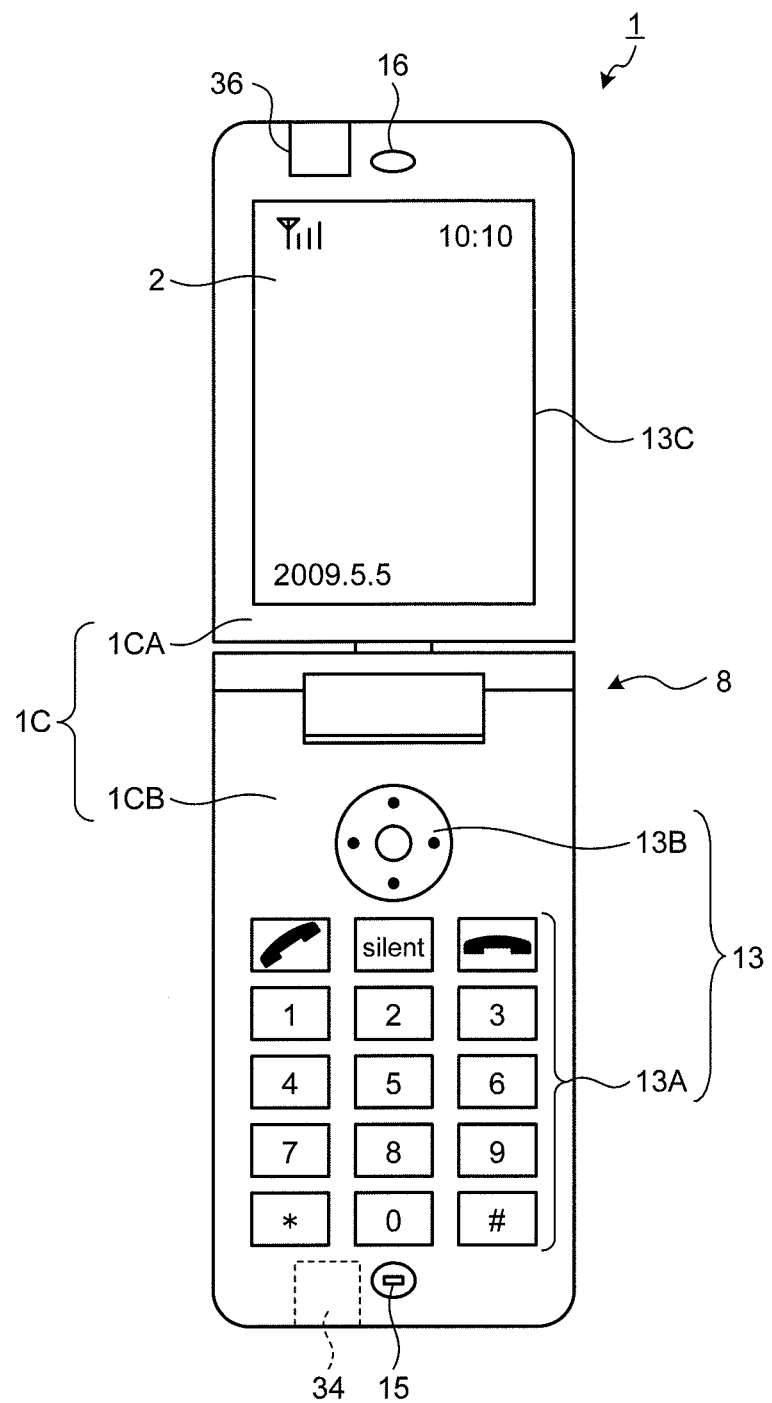
FIG. 1 is a view illustrating a schematic structure of a mobile phone according to the present embodiment.
Figure 2:
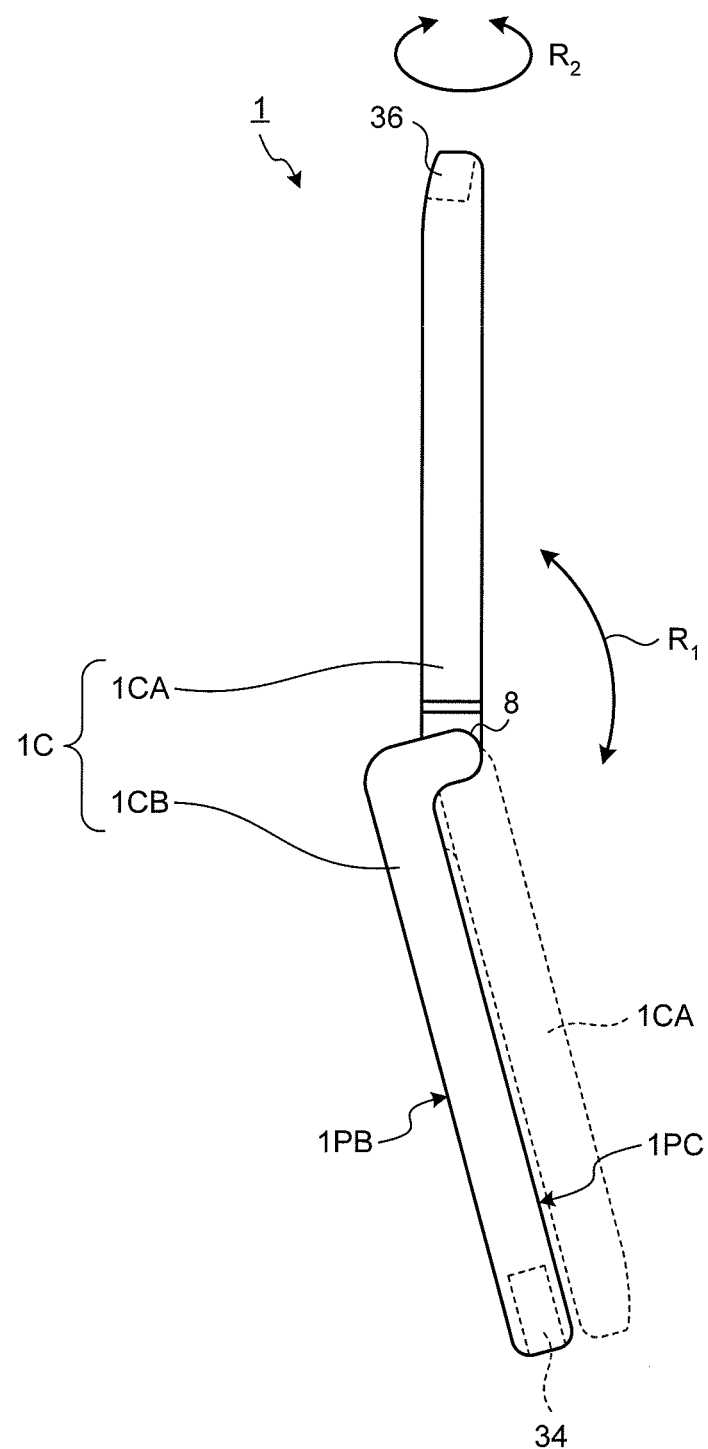
FIG. 2 is a view illustrating the schematic structure of the mobile phone according to the present embodiment.

FIGS. 1 and 2 are views illustrating a schematic structure of a mobile phone according to the present embodiment, respectively. The mobile phone according to the present embodiment is a mobile phone 1 having a projector 34 as illustrated in FIGS. 1 and 2. In the mobile phone 1, a housing 1C is constituted by a plurality of housings. More specifically, the housing 1C is constituted by a first housing 1CA and a second housing 1CB openably and rotatably. In other words, the mobile phone 1 is of a folding type and has a housing capable of switching a surface of the first housing 1CA which faces the second housing 1CB in a folding state. The housing of the mobile phone 1 is not limited to such a structure.

The first housing 1CA and the second housing 1CB are coupled to each other by means of a hinge mechanism 8 to be a coupling unit. The first housing 1CA and the second housing 1CB are coupled to each other by means of the hinge mechanism 8 so that the first housing 1CA and the second housing 1CB can be rotated together around the hinge mechanism 8 and can be rotated in a separating direction from each other and an approaching direction each other (a direction illustrated in an arrow $R_1$ in FIG. 2). The mobile phone 1 is brought into an opening state when the first housing 1CA and the second housing 1CB are rotated in the separating direction from each other, and is closed into a folding state when the first housing 1CA and the second housing 1CB are rotated in the approaching direction each other (a state illustrated in a dotted line of FIG. 2). The hinge mechanism 8 is further constituted in such a manner that the first housing 1CA can be rotated with respect to the second housing 1CB around a rotating axis (a direction illustrated in an arrow $R_2$ of FIG. 2) which is a parallel axis with a longitudinal direction of a surface of the first housing 1CA having the largest area with respect to the second housing 1CB. In other words, the hinge mechanism 8 is constituted in such a manner that the first housing 1CA can be rotated with itself set to be a reference point and the parallel axis with the longitudinal direction of the surface of the first housing 1CA having the largest area set to be a rotating axis. In other words, the hinge mechanism 8 has two rotating axes and can rotate the first housing 1CA and the second housing 1CB around the respective rotating axes.

A display 2 illustrated in FIG. 1 is provided as a display unit in the first housing 1CA. The display 2 displays a standby image in a state in which the mobile phone 1 stands by a receipt or displays a menu image to be used for assisting an operation of the mobile phone 1. A touch panel detecting unit 13C is disposed on an upper surface of the display 12 and detects a contact of a user. In addition, the first housing 1CA is provided with a receiver 16 to be output means for outputting a voice in a telephone call of the mobile phone 1. A camera 36 is provided on a side of the housing 1CA which is opposite to the hinge mechanism 8.

The second housing 1CB is provided with a plurality of operation keys 13A for inputting a telephone number of a calling party or a character in a composition of a mail and a direction and determination key 13B for selecting and determining a menu displayed on the display 2 and easily executing a scroll of a screen or the like. The operation key 13A and the direction and determination key 13B constitute an operating unit 13 of the mobile phone 1. Moreover, the second housing 1CB is provided with a microphone 15 to be voice acquiring means for receiving a voice in the telephone call of the mobile phone 1. The operating unit 13 is provided on an operating surface 1PC of the second housing 1CB illustrated in FIG. 2. A surface on an opposite side to the operating surface 1PC is a back face 1PB of the mobile phone 1.

An antenna is provided in the second housing 1CB. The antenna is a transmitting/receiving antenna to be used for a radio communication and is used for transmitting and receiving an electric wave (an electromagnetic wave) related to a telephone call, an electronic mail or the like between the mobile phone 1 and a base station. Moreover, the second housing 1CB is provided with the microphone 15. The microphone 15 is disposed on the operation surface 1PC side of the mobile phone 1 illustrated in FIG. 2.

The projector 34 serving as an image projecting unit is provided on a side of the second housing 1CB which is opposite to the hinge mechanism 8. By the structure, an image can be projected onto a projection target by means of the projector 34 and an image can be captured by means of the camera 36. A light irradiating port of the projector 34 is exposed to an outside of the second housing 1CB and a taking lens of the camera 36 is exposed to an outside of the first housing 1CA.

Figure 3:
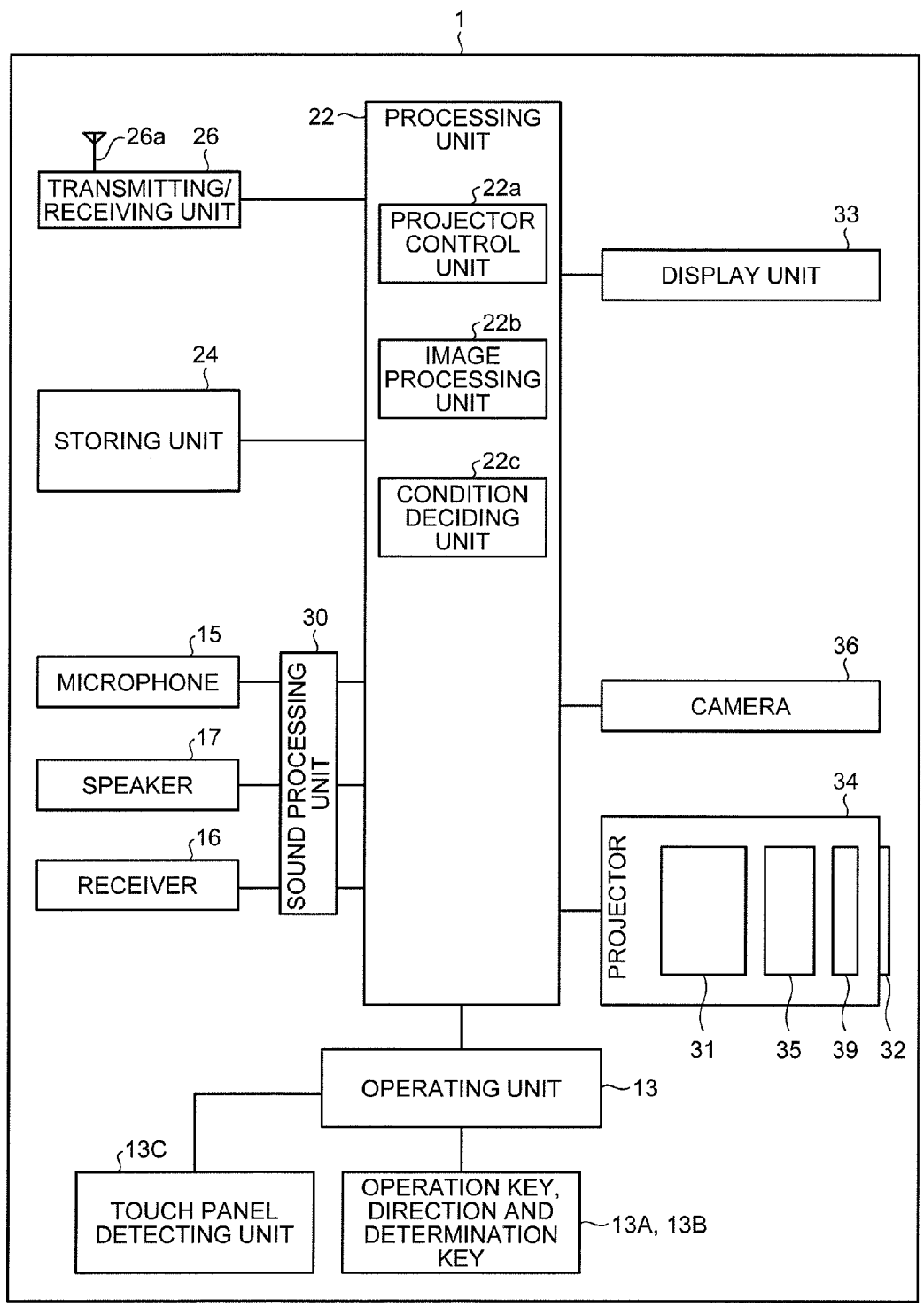
FIG. 3 is a block diagram illustrating a schematic structure of a function of the mobile phone illustrated in FIG. 1.

FIG. 3 is a block diagram illustrating a schematic structure of a function of the mobile phone illustrated in FIG. 1. As illustrated in FIG. 3, the mobile phone 1 has the operating unit 13, a processing unit 22, a storing unit 24, a transmitting/receiving unit 26, a sound processing unit 30, a display unit 33, the projector 34, and the camera 36.

The operating unit 13 is constituted by the operation key 13A to which various functions, for example, a power key, a telephone call key, a numeric key, a character key, a direction key, a determination key, a sending key and the like are allocated, the direction and determination key 13B, and the touch panel detecting unit 13C for detecting any portion of an image displayed on the display 2 that an operator touches. When an input to these keys or the touch panel is carried out by an operation of the user, a signal corresponding to the content of the operation is generated. The generated signal is input, as an instruction of the user, to the processing unit 22.

The processing unit 22 has a function for integrally controlling a whole operation of the mobile phone 1. In other words, the processing unit 22 controls the operations of the transmitting/receiving unit 26, the sound processing unit 30, the display unit 33 and the like in such a manner that various processings of the mobile phone 1 are executed in a proper procedure depending on the operation of the operating unit 13 or software stored in the storing unit 24 of the mobile phone 1.

For example, various processings of the mobile phone 1 include a voice telephone call to be carried out through a circuit switched network, a composition, transmission, and receipt of an e-mail, browsing of Web (World Wide Web) site of the internet, and the like. Moreover, the operations of the transmitting/receiving unit 26, the sound processing unit 30, the display unit 33 and the like include a transmission and receipt of a signal through the transmitting/receiving unit 26, an input and output of a sound through the sound processing unit 30, a display of an image through the display unit 33 and the like, for example.

The processing unit 22 executes a processing based on a program stored in the storing unit 24 (for example, an operating system program, an application program or the like). The processing unit 22 is constituted by a microprocessor unit (MPU: Micro Processing Unit), for example, and executes the various processings of the mobile phone 1 in accordance with a procedure specified by the software. In other words, the processing unit 22 sequentially reads an instruction code from the operating system program, the application program or the like which is stored in the storing unit 24, and executes the processing.

The processing unit 22 has a function for executing a plurality of application programs. The application program to be executed by the processing unit 22 includes a plurality of application programs, for example, an application program for controlling a driving operation of the projector 34 or the camera 36, an application program for reading various image files (image information) from the storing unit 24 and decoding them, an application program for displaying, on the display unit 33, an image obtained by the decoding or projecting the image onto the projector 34, an application program for photographing an image or a moving image by means of the camera 36, and the like.

In the present embodiment, the processing unit 22 has a projector control unit (a control unit) 22a, an image processing unit 22b, and a condition deciding unit 22c. A function possessed by each of the projector control unit 22a, the image processing unit 22b, and the condition deciding unit 22c is implemented through an execution of a task allocated by the control unit of the processing unit 22 through a hardware resource constituted by the processing unit 22 and the storing unit 24. The task represents a whole processing which is being carried out by application software or a unit of processings which are being carried out by the same application software and cannot be executed at the same time. The projector control unit 22a controls the projector 34. The image processing unit 22b generates an image to be projected onto the projector 34 or an image to be displayed on the display unit 33. The condition deciding unit 22c decides a divergence of a control condition.

The storing unit 24 stores software and data which are to be utilized for the processing in the processing unit 22, and stores a task for operating the application program to control the driving operation of the projector 34 or the camera 36 and a task for operating the image processing program. Moreover, the storing unit 24 stores, in addition to these tasks, a communication, downloaded sound data, software to be used by the processing unit 22 in a control for the storing unit 24, an address book for describing and managing a telephone number, a mail address and the like for a communicating partner, a sound file such as a dial tone or a ring tone, temporary data to be used in a software processing process, and the like.

A computer program or temporary data which is used in the software processing process is temporarily stored in a work area allocated to the storing unit 24 by the processing unit 22. The storing unit 24 is constituted by a nonvolatile storage device (nonvolatile semiconductor memory such as ROM: Read Only Memory, a hard disk device or the like), a random access storage device (for example, SRAM: Static Random Access Memory, DRAM: Dynamic Random Access Memory) or the like, for example.

The transmitting/receiving unit 26 has an antenna 26a, and establishes a radio signal path by a CDMA (Code Division Multiple Access) system or the like with a base station through a channel allocated by the base station, and carries out a telephone communication and an information communication together with the base station.

The sound processing unit 30 executes a processing for a sound signal input to the microphone 15 or a sound signal output from the receiver 16 or a speaker 17. The display unit 33 has the display 2 described above, and displays, on the display panel, an image corresponding to image data supplied from the processing unit 22 or an image corresponding to image data. The display unit 33 may have a subdisplay in addition to the display 2.

The projector 34 is constituted by a light source unit and an optical system for switching whether or not a light emitted from the light source unit is projected based on image data. In the present embodiment, the projector 34 is constituted to include a light source unit 31, an irradiating unit (a drawing device) 35 to be an optical system, a light shape changing unit 39, and a light irradiating port 32. The light source unit 31 irradiates a laser beam to be a visible light. A light in a visible light region has a short wavelength side of 360 nm to 400 nm or more and a long wavelength side of 760 nm to 830 nm or less. In the present embodiment, the light source unit 31 irradiates lights having three colors of R (Red), G (Green), and B (Blue).

The irradiating unit 35 synthesizes the lights having the three colors which are irradiated from the light source unit 31 and irradiates the light thus obtained on an image projection target. The irradiating unit 35 is constituted to include a switching element for switching whether the light emitted from the light source unit 31 is transmitted or not, and a mirror for carrying out a raster scan over a light passing through the switching element. Then, the irradiating unit 35 changes an angle of a laser beam emitted from the light source unit 31 by means of the mirror, thereby scanning the laser beam over the image projection target to project the image generated by the image processing unit 22b onto the image projection target.

As the mirror, a MEMS (Micro Electro Mechanical System) mirror is used, for example. The MEMS mirror is driven by utilizing a piezoelectric element to scan a visible light irradiated from the light source unit 31, thereby generating a visible image. In this case, it is possible to project the visible image onto the image projection target by changing the angle of the light irradiated from the light source unit 31 through the mirror to scan the light irradiated from the light source unit 31 over a whole surface of the image projection target. Thus, the projector 34 is a projector using a scan method. A structure of the projector 34 is not limited to the structure in which the laser is set to be the light source unit 31. For example, the projector 34 may be a projector having a structure in which a halogen light, an LED or an LD is set to be the light source unit 31 and an LCD (Liquid Crystal Display) or a DMD (Digital Micro-mirror Device) is provided as the irradiating unit 35 of the optical system.

Figure 4:
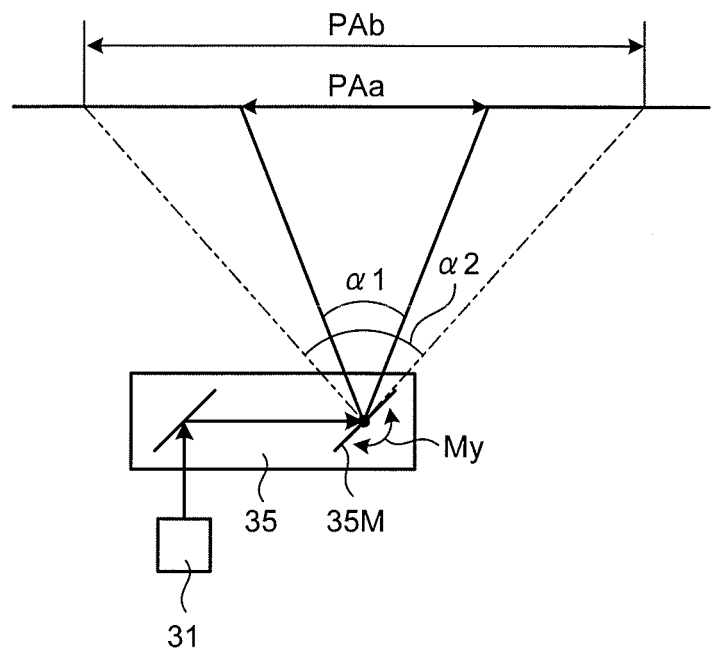
FIG. 4 is a schematic view for explaining an operation of an irradiating unit.
Figure 5:
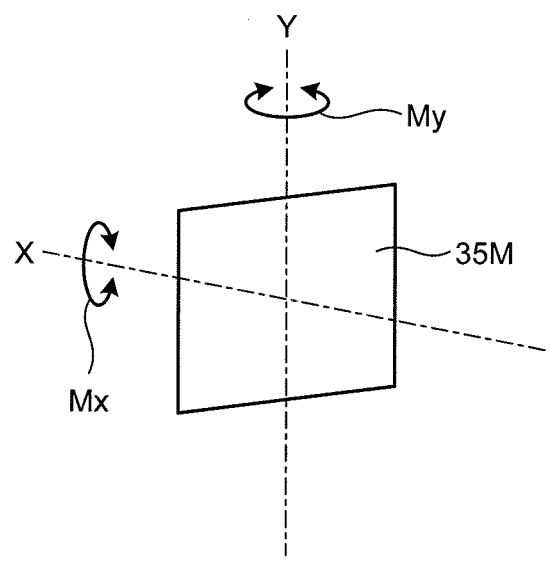
FIG. 5 is a schematic view for explaining an operation of a mirror constituting the irradiating unit.

FIG. 4 is a schematic view for explaining an operation of an irradiating unit. FIG. 5 is a schematic view for explaining an operation of a mirror constituting the irradiating unit. In the present embodiment, an operation range of a mirror 35M constituting the irradiating unit 35 is changed so that a projection region of the projector 34 is varied. The mirror 35M changes an angle of a laser beam emitted from the light source unit 31, and furthermore, is swung around an X axis and a Y axis which are illustrated in FIG. 5 (directions illustrated in arrows Mx and My) to scan the laser beam over an image projection target. FIG. 4 illustrates a state in which the mirror 35M is swung around the Y axis (a direction illustrated in an arrow MY of FIG. 4) to scan the laser beam in the X-axis direction. By a change in an angle at which the mirror 35M is swung from $\alpha 1$ to $\alpha 2$, ($\alpha 1 < \alpha 2$), a scanning range of the laser beam in the image projection target is varied from PAa to PAb.

Figure 6:
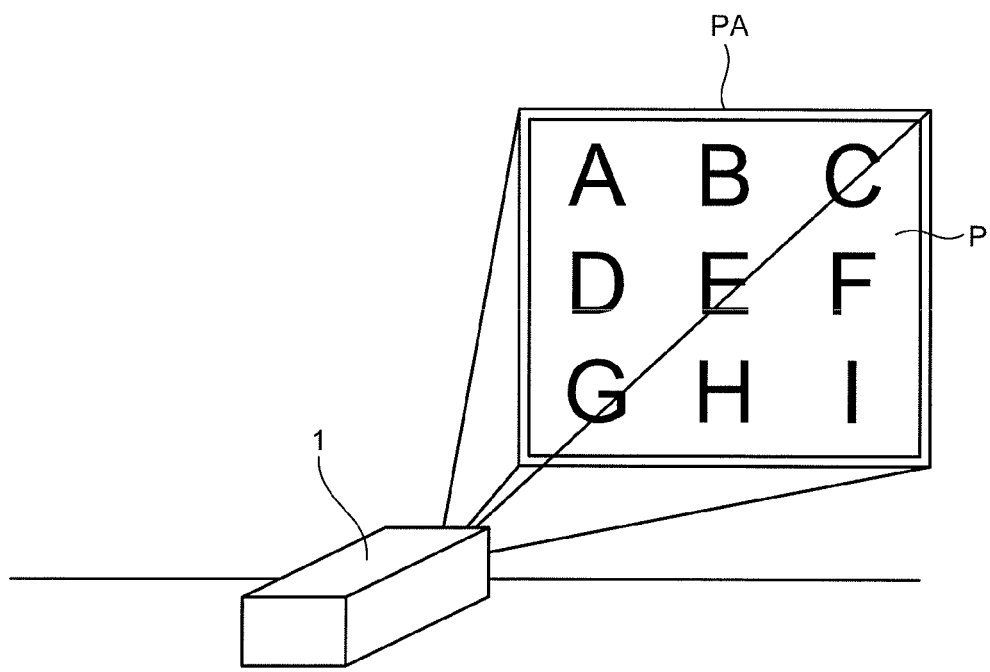
FIG. 6 is an explanatory view illustrating a state in which an image is displayed by means of a projector of the mobile phone illustrated in FIG. 1.

FIG. 6 is an explanatory view illustrating a state in which an image is displayed through the projector of the mobile phone illustrated in FIG. 1. As described above, the projector 34 has the light irradiating port 32 exposed to the outside of the housing 1C in the mobile phone 1. The mobile phone 1 projects an image from the projector 34 so that an image P can be projected into a predetermined region (a projection region) PA in an image projection target (for example, a wall surface, a floor or the like) in a position opposed to an image projection surface of the projector 34, as illustrated in FIG. 6.

Figure 7:
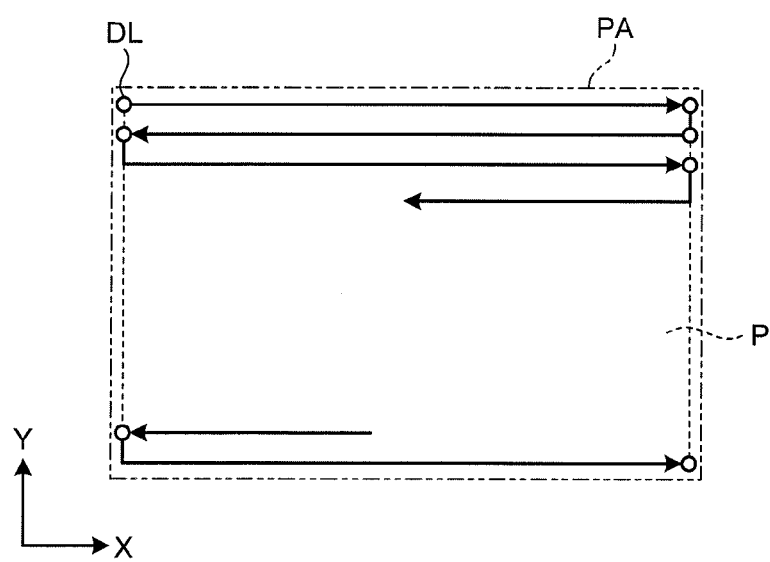
FIG. 7 is a schematic view illustrating a drawing method in a scan type projector.

FIG. 7 is a schematic view illustrating a drawing method in a projector using a scan method. The irradiating unit 35 illustrated in FIG. 3 scans a point (a light spot) DL of a laser beam irradiated from the light source unit 31 of the projector 34 in X and Y directions so that the image P is drawn in the projection region PA of the projector 34. At this time, the light spot DL is reciprocated and scanned in the X direction and is scanned in a single direction with respect to the Y direction. In the drawing through the projector 34, in the case in which the image P is a rectangle, the light spot DL is started to be scanned from a single corner portion and the light spot DL scans a whole region of the image P in the X and Y directions. Consequently, one-time drawing is ended so that a single image P is drawn.

Figure 8:
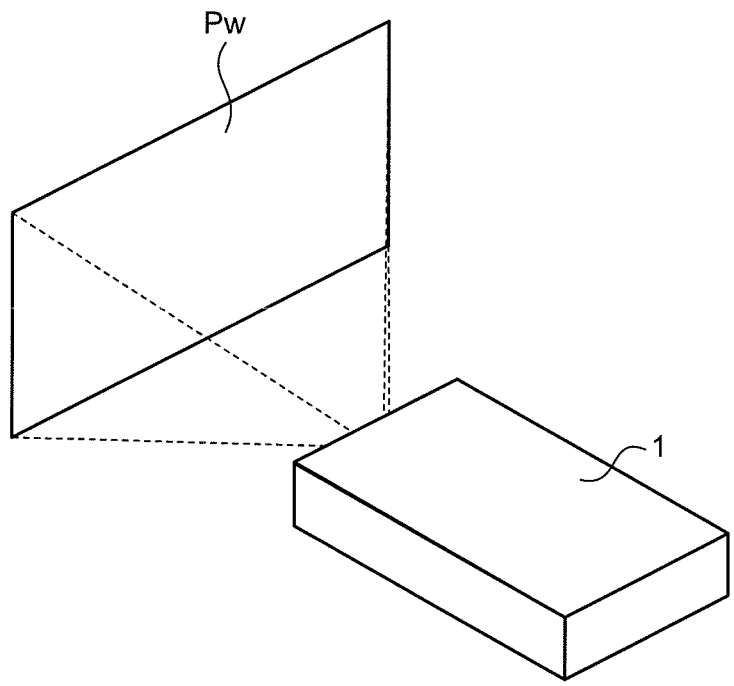
FIG. 8 is a view for explaining a projection mode possessed by the mobile phone.
Figure 9:
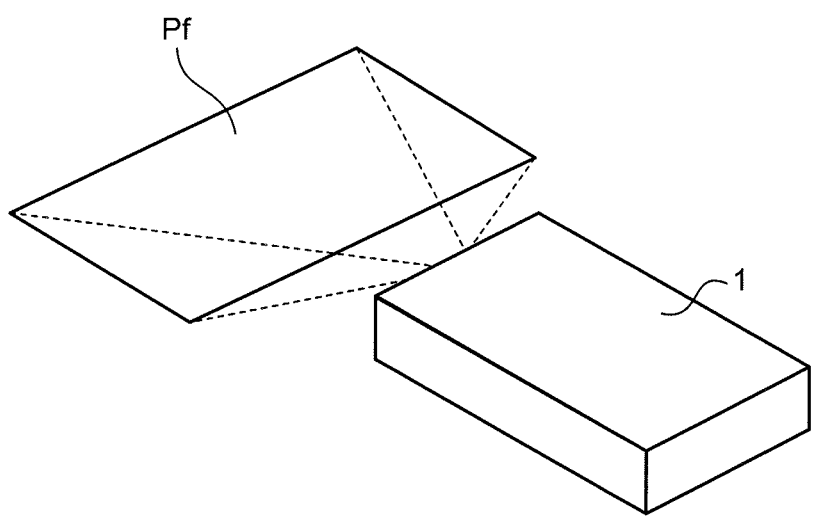
FIG. 9 is a view for explaining the projection mode possessed by the mobile phone.

FIGS. 8 and 9 are views for explaining a projection mode possessed by the mobile phone according to the present embodiment, respectively. FIG. 8 illustrates a first projection mode and FIG. 9 illustrates a second projection mode. The mobile phone 1 according to the present embodiment has at least two modes (projection modes) for projecting an image onto a projection target, that is, the first projection mode and the second projection mode. The first projection mode serves to project an image Pw onto a projection target (for example, a wall) or the like which is present on a front surface of the light irradiating port 32 of the projector 34 provided in the mobile phone 1 as illustrated in FIG. 8, for instance. The second projection mode serves to project an image Pf onto a projection target (for example, a floor or a ceiling) or the like which is present in an obliquely lower part or an obliquely upper part of the light irradiating port 32 of the projector 34 provided in the mobile phone 1 as illustrated in FIG. 9, for instance.

In the first projection mode, an irradiating direction of a light to be irradiated from the light irradiating port 32 of the projector 34 is set to be a front direction of the light irradiating port 32 in a state in which the mobile phone 1 is mounted on a horizontal plane. Consequently, the image Pw is projected from the projector 34 onto a wall of a front of the light irradiating port 32, for example. In the second projection mode, the irradiating direction of the light irradiated from the light irradiating port 32 of the projector 34 is set to be an obliquely downward direction with respect to a horizontal plane or an obliquely upward direction with respect to the horizontal plane in the state in which the mobile phone 1 is mounted on the horizontal plane. Consequently, the image Pf is projected from the projector 34 onto a floor on which the projector 34 is mounted, for example. The horizontal plane is orthogonal to a vertical direction (a direction in which a gravity acts). It is possible to switch a projecting direction of an image by regulating an angle of a mirror for reflecting a light. In the case in which the projecting direction is switched, an image to be projected is gradually enlarged apart from the mobile phone 1 so that, for example, a rectangular image is changed to be trapezoidal, and is thus projected particularly in the second projection mode. Therefore, it is preferable to carry out a trapezoidal correction. Furthermore, a swing angle of the mirror or a swing speed may be switched.

Thus, the mobile phone 1 has at least two modes, that is, the first projection mode and the second projection mode. Therefore, the image can also be projected through the projector 34 onto a surface of a desk on which the mobile phone 1 is mounted, a floor or the like in addition to a screen and a wall. Consequently, it is possible to enhance a usability of the projector 34 provided in the mobile phone 1. Moreover, it is possible to project an image on the mounting surface of the mobile phone 1 or below the mounting surface while the mobile phone 1 remains mounted on a desk or the like. Consequently, it is not necessary to dispose the mobile phone 1 again. In addition, a user does not need to hold the mobile phone 1 by a hand, thereby turning the light irradiating port 32 downward. As a result, it is possible to further enhance the usability of the projector 34 provided in the mobile phone 1.

Returning to FIG. 3, the mobile phone 1 will further be described. The camera 36 is an image capturing system disposed on an end of the first housing 1CA at an opposite side to the hinge mechanism 8. The camera 36 transmits an acquired image to the image processing unit 22b of the processing unit 22.

Figure 10:
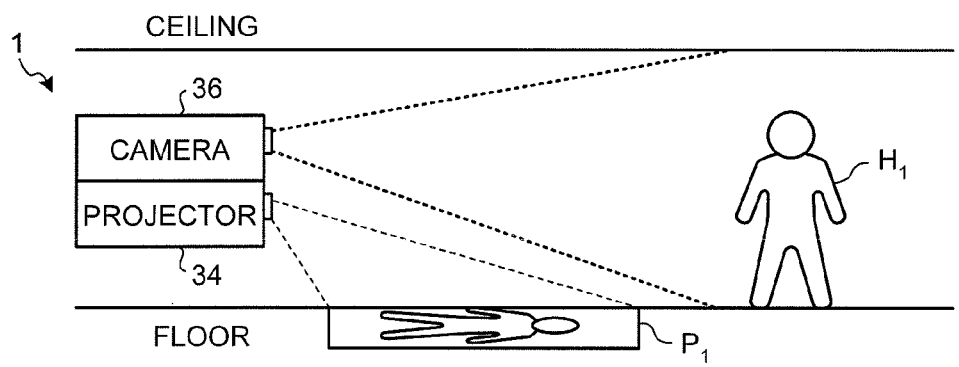
FIG. 10 is a view for explaining the projection mode through the mobile phone.
Figure 11:
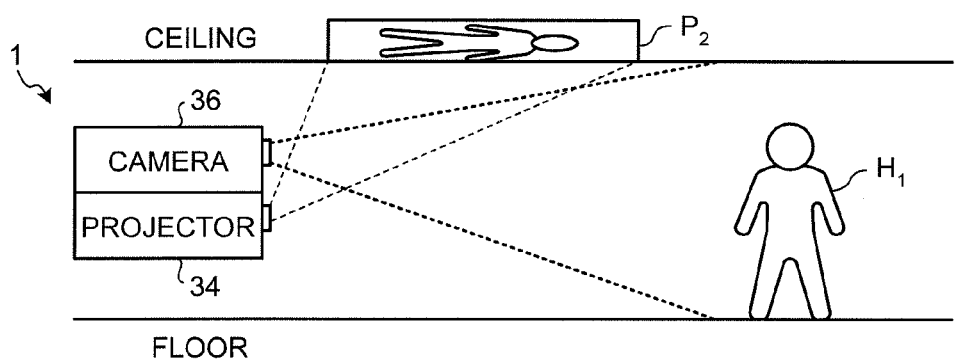
FIG. 11 is a view for explaining the projection mode through the mobile phone.
Figure 12:
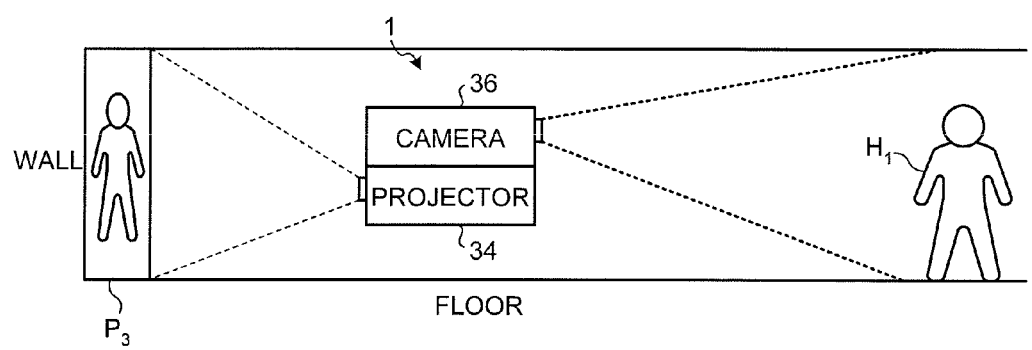
FIG. 12 is a view for explaining the projection mode through the mobile phone.

Next, the image capturing operation of the mobile phone will be described with reference to FIGS. 10 to 12. FIGS. 11 to 12 are views for explaining the projection mode of the mobile phone, respectively. In FIGS. 10 to 12, only the projector 34 and camera 36 units of the mobile phone 1 are illustrated and a representation of the other units is omitted. The mobile phone 1 illustrated in FIGS. 10 and 11 is set into a state in which the first housing CA and the second housing 1CB are closed, and the mobile phone 1 illustrated in FIG. 12 is set into a state in which the first housing 1CA and the second housing 1CB are opened.

As illustrated in FIG. 10, when photographing an image by the camera 36, the mobile phone 1 projects the image acquired by the camera 36 as a preview image $P_1$ through the projector 34. In the example illustrated in FIG. 10, the projector 34 projects the preview image $P_1$ onto the floor. An image including a person $H_1$ to be a subject acquired by the camera 36 is projected as the preview image $P_1$.

The mobile phone 1 illustrated in FIG. 10 projects the preview image $P_1$ onto the floor; however a region on which the projected image is displayed is not limited to the floor. The mobile phone 1 may project a preview image $P_2$ toward the ceiling by means of the projector 34 in the image photographing operation as illustrated in FIG. 11. Referring to the preview image $P_2$, similarly, an image including the person $H_1$ to be the subject acquired by the camera 36 is projected. The projector 34 can change a direction in which an image is projected by switching the angle of the mirror as described above.

As illustrated in FIG. 12, the mobile phone 1 can also project a preview image $P_3$ onto a surface (a wall in the present embodiment) at an opposite side to a direction in which the person $H_1$ is present by means of the projector 34. In the case in which an image is projected onto an opposite side to a photographing direction (a direction in which a subject is present) as illustrated in FIG. 12, it is necessary to bring a state in which the first housing 1CA and the second housing 1CB are opened. As illustrated in FIGS. 10 to 12, the mobile phone 1 projects a preview image into a position in which a person to be a subject present in a photographing position can see an image. Furthermore, the preview image is projected into a different region from a region in which an image is photographed by means of the camera 36.

Figure 13:
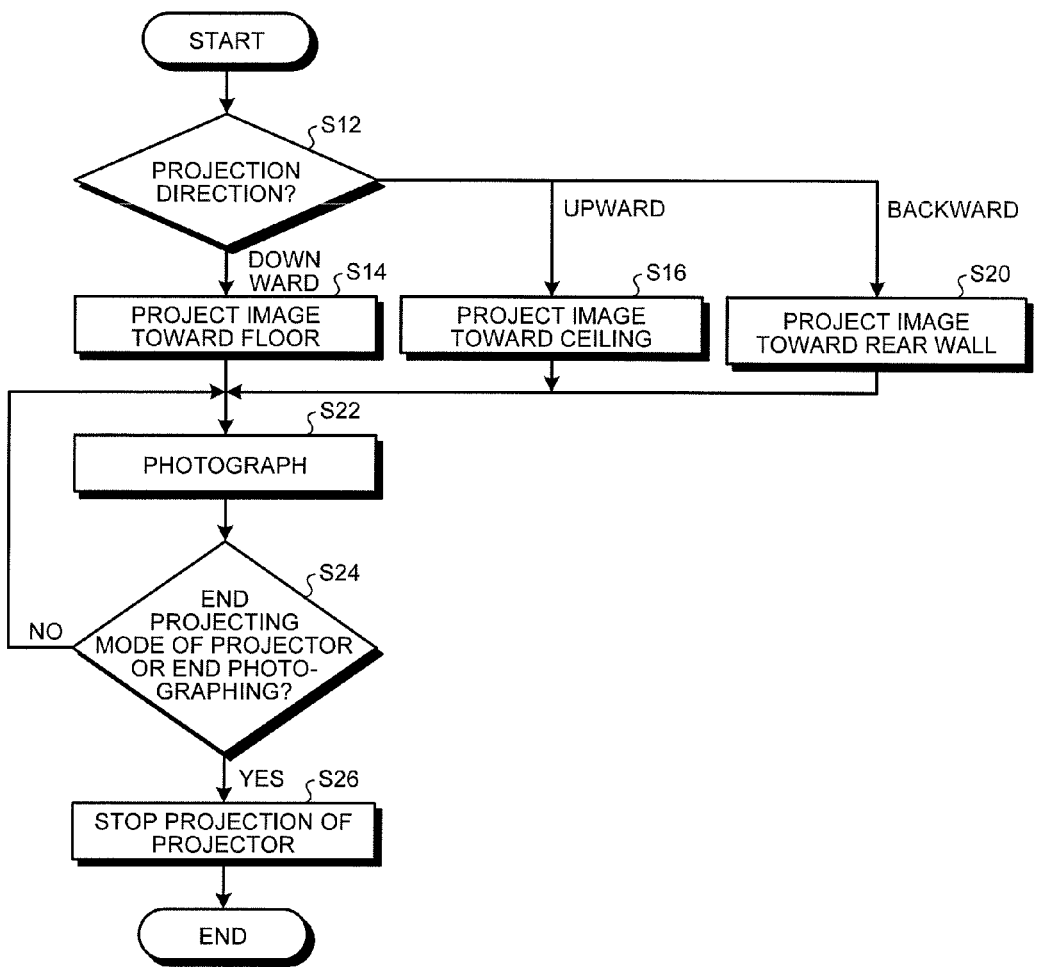
FIG. 13 is a flow chart illustrating an example of a photographing operation of the mobile phone.

Next, an operation in the photographing operation of the mobile phone will be described with reference to FIG. 13. FIG. 13 is a flow chart illustrating an example of the photographing operation of the mobile phone. A processing which will be described below is carried out by acquiring necessary information for each unit of the mobile phone 1 and processing the acquired information through the projector control unit 22a, the image processing unit 22b, and the condition deciding unit 22c in the processing unit 22. First of all, an instruction for starting a mode for photographing an image is input through an operation of an operator. The mobile phone 1 starts the camera 36 to acquire an image in a photographing region when the starting instruction is input. Furthermore, the mobile phone 1 decides a projection direction at Step S12. In other words, the mobile phone 1 decides a position into which the image acquired by the camera 36 is projected, more specifically, into which direction the image is projected among upward, downward, and backward. The mobile phone 1 carries out the processing by the condition deciding unit 22c of the processing unit 22. The projecting position may be decided based on an instruction input by the operator or based on a previously input condition and/or an attitude of the mobile phone 1, for example, based on whether the housing is closed or opened by using an attitude detecting sensor, a positional relationship between the projector and the camera, or the like.

When deciding that an image is projected downward at the Step S12, the mobile phone 1 projects the image downward, more specifically, toward a floor by the projector 34 at Step S14. The image to be projected is acquired by the camera 36. Thus, the mobile phone 1 projects the image downward, thereby projecting a preview image onto the floor as illustrated in FIG. 10.

When deciding that the image is projected upward at the Step S12, the mobile phone 1 projects the image upward, more specifically, toward a ceiling by the projector 34 at Step S16. Thus, the mobile phone 1 projects the image upward, thereby projecting a preview image onto the ceiling as illustrated in FIG. 11.

When deciding that the image is projected backward at the Step S12, the mobile phone 1 projects the image backward, more specifically, toward a rear wall by the projector 34 at Step S20. Thus, the mobile phone 1 projects the image toward the rear wall, thereby projecting a preview image onto the rear wall as illustrated in FIG. 12.

When the photographing instruction is input in a state in which the preview image is projected from the Steps S14 to S20, an image is photographed at Step S22. In other words, the mobile phone 1 stores an image acquired by the camera 36 in the storing unit 24 in a timing in which a shutter is pressed down, for example, a timing in which a release timer counts down to zero or the like.

When the photographing operation is carried out at the Step S22, the mobile phone 1 decides whether a projector projecting mode is ended or the photographing operation is ended at Step S24. In other words, the mobile phone 1 decides whether an instruction for ending the projection of the projector 34 is input or an instruction for ending the photographing mode is given (input).

When the mobile phone 1 decides that neither the instruction for ending the photographing mode of the projector nor the instruction for ending the photographing operation is given at the Step S24 (No), the processing proceeds to the Step S22 in which the photographing operation is repeated to acquire an image. If the mobile phone 1 decides that either of the instructions for ending the projecting mode of the projector and for ending the photographing operation is input at the Step S24 (Yes), the photographing operation of the projector 34 is stopped at Step S26, that is, the projection of a preview image is ended, and the processing is ended. In the case of the instruction for ending the projecting mode of the projector, that is, the instruction for ending the projection of the preview image through the projector 34, the preview image may be displayed on the display unit 33 to continuously carry out the operation for photographing an image.

As described above, the mobile phone 1 projects a preview image through the projector 34 when an image is photographed. Thereby, a person to be the subject can know a state of the image acquired by the camera 36 in the operation for photographing the image. Consequently, it is possible to regulate a standing position or his/her posture while confirming a state in which the person to be the subject is photographed. Accordingly, it is possible to acquire an image to be satisfied by the person serving as the subject more easily. Moreover, a preview image can be confirmed by using a release timer (a self timer) in a state in which the photographer is the subject also in the case in which the photographer himself (herself) becomes the subject. Therefore, it is possible to accurately grasp a positional relationship with a background in the photographing operation or the like. Thus, it is possible to acquire a desirable image more easily. As a result, it is possible to reduce the necessity for acquiring the image many times, thereby acquiring a desirable image efficiently. Moreover, in the case in which another person is asked to press down a photographing button (a shutter), it is possible to carry out the photographing operation while seeing a preview image by both a photographer and a subject. Consequently, it is possible to acquire an image having a desirable angle. In addition, the subjects can also grasp an image acquired in the photographing operation. Thus, it is possible to omit a confirmation of an image after the photographing operation or the like.

By projecting an image through the projector 34 of the mobile phone 1, it is possible to display a large image by a small device. Thus, it is possible to display an image which can be confirmed by the subject while maintaining the device to be small-sized. Moreover, it is possible to employ a single portable device.

Figure 14:
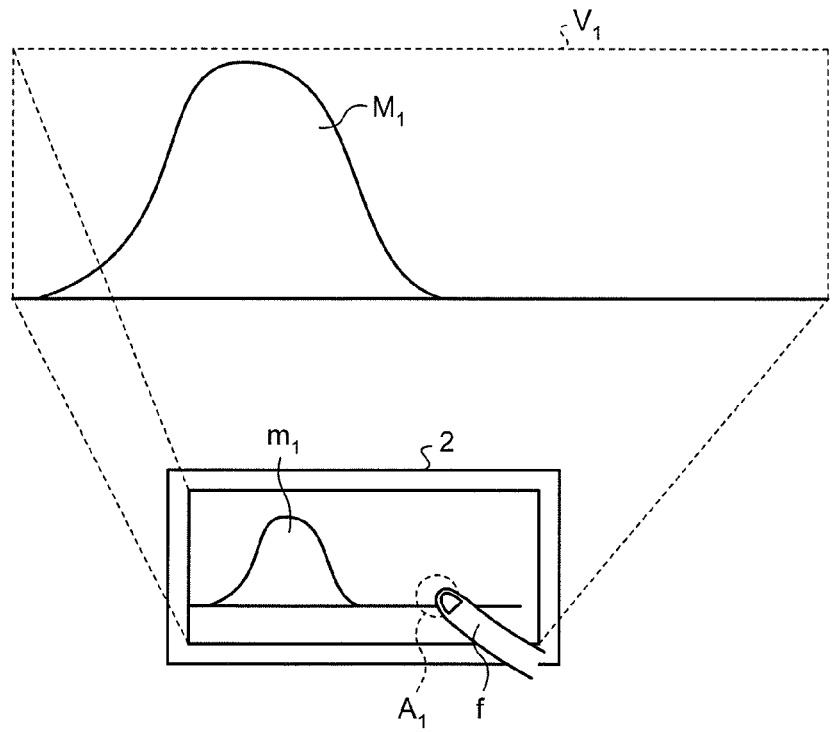
FIG. 14 is a view for explaining the example of the photographing operation of the mobile phone.
Figure 15:
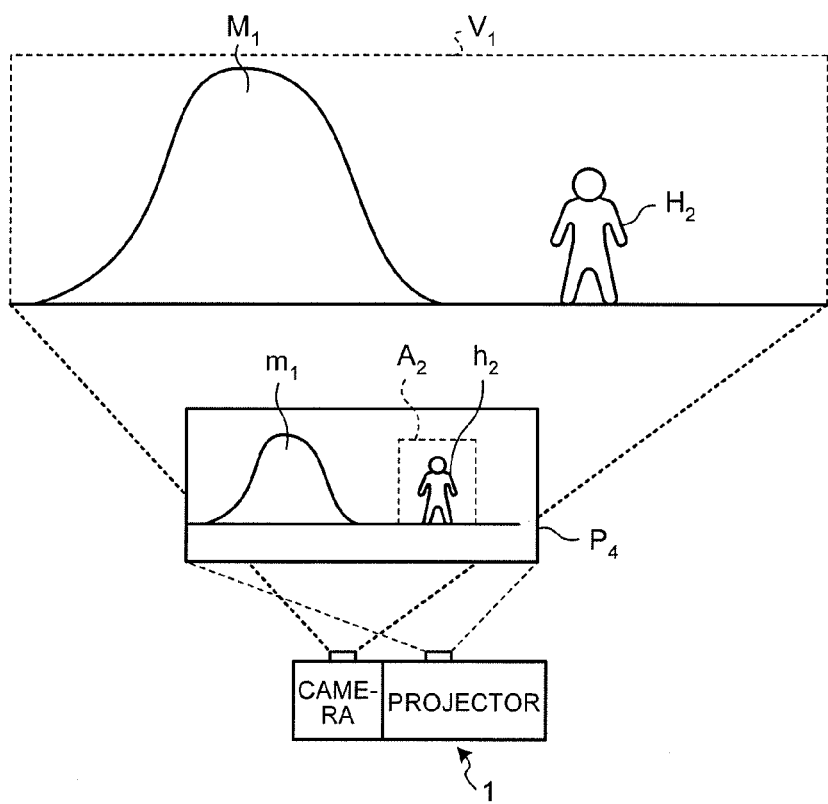
FIG. 15 is a view for explaining the example of the photographing operation of the mobile phone.
Figure 16:
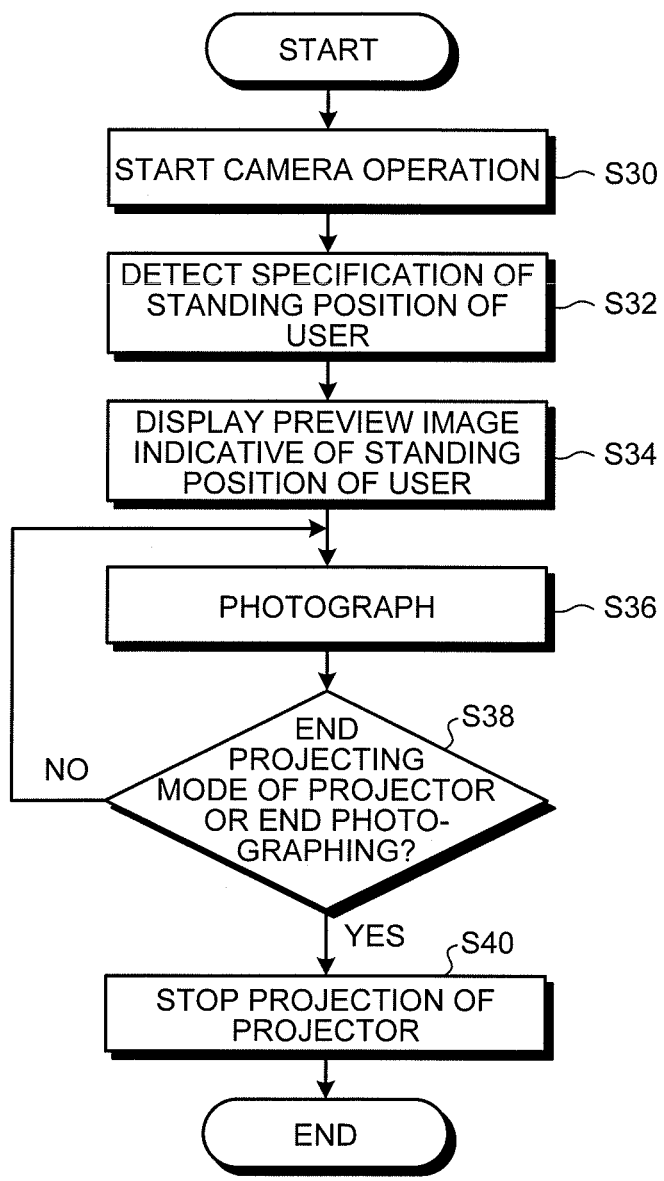
FIG. 16 is a flow chart illustrating another example of the photographing operation of the mobile phone.

The mobile phone 1 can be configured such that an optional region of a photographic image is specified by a photographer and the mobile phone 1 projects a frame indicative of the specified region into a preview image. Description will be given with reference to FIGS. 14 to 16. FIGS. 14 and 15 are views for explaining an example of the photographing operation of the mobile phone respectively, and FIG. 16 is a flow chart illustrating another example of the photographing operation of the mobile phone. In the present embodiment, the preview image is displayed also on the display 2. Moreover, the mobile phone 1 is set to a form in which the display 2 is disposed outward.

First of all, when the mobile phone 1 is first set into the photographing mode so that an image is started to be acquired by the camera 36, a preview image is displayed on the display 2 as illustrated in FIG. 14. In an example illustrated in FIG. 14, the camera 36 acquires an image of a photographing region $V_1$ in which a mountain $M_1$ is present as a subject, and an image of a mountain $m_1$ is displayed on the display 2. In such a state, an operator causes a finger f to come in contact with a region $A_1$ on the display 2. When the finger f comes into contact with the region $A_1$, the touch panel detecting unit 13C detects the contact and transmits a detection signal to the processing unit 22.

When the operator specifies the region $A_1$, the mobile phone 1 displays, as a preview image $P_4$ to be projected by the projector 34, a frame $A_2$ surrounding a region corresponding to the region $A_1$ in addition to the image of the photographing region $V_1$ which is acquired by the camera 36, as illustrated in FIG. 15. In other words, an image of the frame is synthesized with the image acquired by the camera 36, and the synthesized image is projected by the projector 34.

Next, the operation of the mobile phone 1 will be described with reference to FIG. 16. In the present embodiment, it is assumed that the preview image is set to be projected in a downward direction, that is, onto a floor or a ground. First of all, when an instruction for activating the image photographing mode is input by an operator, the mobile phone 1 starts a camera operation at Step S30. In other words, the camera 36 is activated to start an operation for acquiring an image. Moreover, the mobile phone 1 displays the acquired image on the display 2. The mobile phone 1 may cause the projector 34 to project the acquired image in a stage in which the image is acquired by the camera 36.

When the mobile phone 1 acquires the image at the Step S30, the mobile phone 1 detects the specification of a standing position of a user at Step S32. More specifically, the mobile phone 1 detects a contact with the touch panel detecting unit 13C by the operator in a state in which an image is displayed on the display 2. The mobile phone 1 detects the region contacted by the user as the specification of the standing position of the user.

When detecting the specification of the standing position at the Step S32, the mobile phone 1 displays a preview image indicative of the standing position of the user at Step S34. More specifically, an image of a frame is created based on the position information acquired at the Step S32, and the image of the frame thus created is synthesized with an image acquired by the camera 36. Consequently, as illustrated in FIG. 15, the image having the frame synthesized with the region specified by the user is projected by the projector 34.

When the photographing instruction is input in a state in which the preview image having the frame synthesized is projected at the Step S34, the mobile phone 1 photographs an image at Step S36. In other words, the mobile phone 1 stores, in the storing unit 24, the image acquired by the camera 36 in a timing in which the shutter is pressed down, the release timer counts down to zero or the like. In other words, the storing unit 24 stores the image photographed by the camera 36. Also in the other cases, the storing unit 24 stores the acquired image in the same manner.

When the photographing is carried out at the Step S36, the mobile phone 1 decides whether a projector projecting mode is ended or the photographing operation is ended at Step S38. In other words, the mobile phone 1 decides whether an instruction for ending the projection of the image through the projector 34 is input or an instruction for ending the photographing mode is given (input).

If the mobile phone 1 decides that neither the instruction for ending the projecting mode of the projector nor the instruction for ending the photographing operation is given at the Step S38 (No), the processing proceeds to the Step S36 in which the photographing operation is repeated to acquire an image. If the mobile phone 1 decides that either of the instructions for ending the projecting mode of the projector and for ending the photographing operation is input at the Step S38 (Yes), the photographing operation of the projector 34 is stopped at Step S40, that is, the projection of a preview image is ended and the processing is thus ended. In the case of the instruction for ending the projecting mode of the projector, that is, the instruction for ending the projection of the preview image through the projector 34, the preview image may be displayed on the display unit 33 to continuously carry out the operation for photographing an image.

Thus, the mobile phone 1 displays the frame $A_2$ on the preview image $P_4$. Thereby, the operator can grasp the position of the region $A_1$ that he/she has specified while seeing the display 2. Consequently, a person $H_2$ to be a subject can change his/her own standing position while grasping positions of the frame $A_2$ and a person $h_2$ (his (or her) own image) which are displayed on the preview image $P_4$. Consequently, it is possible to easily guide the person $H_2$ into the region $A_1$ specified as a reference of a desirable standing position in an image, that is, the frame $A_2$. Moreover, the user can grasp his/her position by referring to the guidance, that is, a frame to be a mark. Therefore, he/she can move to desirable standing positions in a short time.

The present embodiment is not limited to the case in which a photographer is a subject, but an instruction for moving a subject to a region intended by the photographer can also be easier to be understood even if the photographer and the subject are different people from each other. In other words, because the frame is displayed on the preview image which can be confirmed by a person to be the subject in the photographing operation, the person can recognize his/her own standing position more easily than an oral specification of a right, left, front or rear part.

In the embodiment, the frame is displayed as the region in which the person is standing; however, a size of the frame and a display target are not particularly limited but the frame may be displayed by a utilizing method desired by the operator. It is possible to display various images instead of the frame. An image to be synthesized as a preview image is not limited to the frame but it is also possible to display an image indicative of information related to a control of image capturing, for example, a countdown to a photographing operation, a photographing condition (the number of pixels, a brightness, or the number of residual sheets) or the like. In the embodiment, the image synthesized with the preview image is not reflected by the photographic image. In other words, the storing unit 24 stores, as a photographic image, an image acquired by the camera 36, that is, an image having no frame displayed.

In the embodiment, the image photographed by the camera or the image obtained by synthesizing the image photographed by the camera with the image of the frame is projected as the preview image; however, the present invention is not limited thereto but a previous acquired image and the image photographed by the camera may be synthesized and projected as a preview image. For example, an image of a background which is previously photographed may be synthesized with an image of a person acquired by the camera and the synthesized image may be projected as a preview image. By thus projecting the image obtained by synthesizing the previously acquired image with the image photographed by the camera, it is possible to grasp a positional relationship with an original image also in the case in which the synthesized image is photographed. Consequently, it is possible to create an optimum synthesized image. In the case in which the synthesized image is to be acquired, there is employed a method for carrying out photographing in a so-called blue back region in which a background wholly has a blue color and synthesizing an image of the background with the blue back region in the acquired images. Before the synthesized image is photographed, the photographing operation is carried out in a state in which a subject other than the subject to be synthesized and the background are included, and an image is thus acquired. Then, it is also possible to remove an unnecessary background and to extract only a necessary subject by acquiring the image in a state in which the subject to be synthesized is included and carrying out an image processing over the acquired image and the image photographed before photographing the synthesized image to take a difference between the images. Also in a combination of the image from which a necessary subject is extracted and the image of the background, similarly, it is possible to create a preview image. In the case in which the synthesized image is thus photographed, an image displayed on the preview image can be set to be the photographic image. In other words, the storing unit can store an image obtained by synthesizing the image acquired by the camera with a prepared image.

There is employed a method for pressing down the shutter and then carrying out the photographing operation after a certain time by using the release timer in the case in which the photographer also carries out the photographing operation as the subject; however, the present invention is not limited thereto. Description will be given to a suitable example of a method for pressing down the shutter, that is, a method for detecting a photographing timing for acquiring an image by means of a camera.

Figure 17:
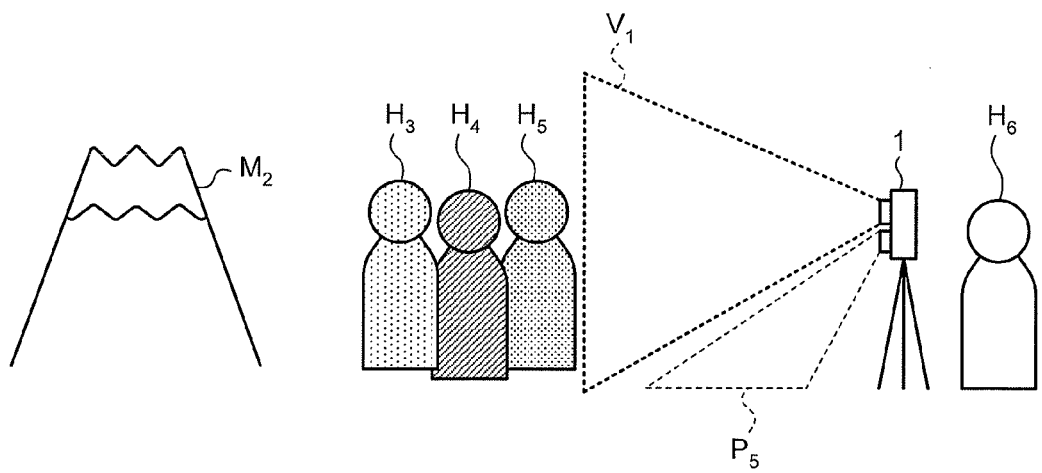
FIG. 17 is a view for explaining another example of the photographing operation of the mobile phone.

First of all, an example will be described with reference to FIGS. 17 to 20. FIGS. 17 to 20 are views for explaining another example of the photographing operation of the mobile phone, respectively. In the present example, the mobile phone 1 is fixed to a tripod, and a photograph in which a mountain $M_2$ to be a background and four people, that is, a person $H_3$, a person $H_4$, a person $H_5$, and a person $H_6$ to be a photographer are included in a photographing region $V_1$ is taken as illustrated in FIG. 17. In FIG. 17, the person $H_6$ to be the photographer operates the mobile phone 1, and the person $H_3$, the person $H_4$, and the person $H_5$ are included in the photographing region $V_1$. The mobile phone 1 projects, as a preview image $P_5$, an image of the photographing region $V_1$ which is acquired by the camera 36, and furthermore, an image obtained by synthesizing a necessary image with the image.

In such a state, the photographer specifies his/her own standing position in the image acquired by the camera 36. More specifically, the operator comes in contact with a corresponding position of an image displayed on the display 2 and the touch panel detecting unit 13C of the mobile phone 1 detects the contact, thereby detecting the contact position as a standing position of a subject. In the present embodiment, the touched position is detected as a position of a face.

Figure 18:
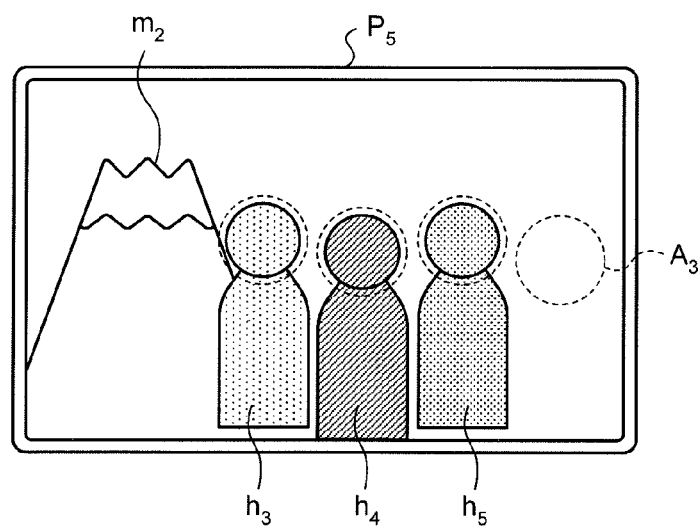
FIG. 18 is a view for explaining another example of the photographing operation of the mobile phone.

When detecting the standing position of the subject, the mobile phone 1 displays a preview image $P_5$ obtained by synthesizing a frame $A_3$ representing a standing position with the image acquired by the camera 36 as illustrated in FIG. 18. As the preview image $P_5$, there are also displayed a mountain $m_2$, a person $h_3$, a person $h_4$, and a person $h_5$ which are acquired by the camera 36.

Figure 19:
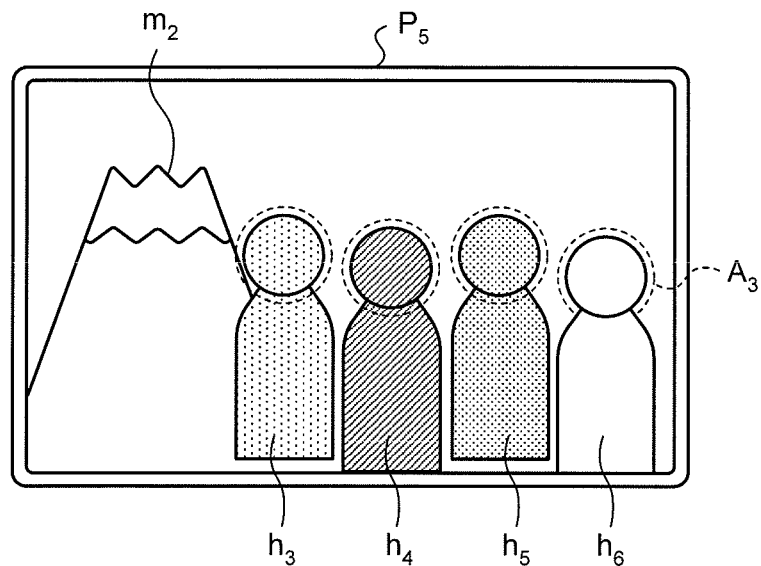
FIG. 19 is a view for explaining another example of the photographing operation of the mobile phone.

When the photographer moves in a state in which the frame $A_3$ is specified as a position of a face and the mobile phone 1 detects that a face of a person $h_6$ enters a region corresponding to the frame $A_3$ as illustrated in FIG. 19, the mobile phone 1 acquires an image at that time. In other words, the photographing operation is carried out by setting, as a trigger, the fact that the face of the person $h_6$ enters the region corresponding to the frame $A_3$. It is possible to decide whether the face of the person $h_6$ enters the corresponding region to the frame $A_3$ by carrying out an image processing over the image acquired by the camera 36 to extract a face. The mobile phone 1 may also display a frame around the face which has already been detected before the photographing operation as illustrated in FIGS. 18 and 19.

When it is detected that (a face of) a person moves to the specified region, thus, the image is photographed. Consequently, it is possible to take a photograph in a state in which a person moves to a desirable position. In the case in which the release timer is used, a waiting time may be unnecessarily taken or the photographer may miss a photographing operation. According to the present example, however, the image is acquired when the image acquired by the camera 36 satisfies a predetermined condition. Therefore, the image can be photographed in a more suitable timing.

Although the mobile phone 1 may acquire an image at the moment the condition is satisfied, it is also possible to acquire the image after a passage of a predetermined time since the condition is satisfied. Consequently, it is possible to make preparations for a certain time after the photographer moves to a predetermined position. In the case in which the photographing operation is carried out after a passage of the certain time, a time left till the photographing operation may be displayed on a preview image. This respect can be applied to each example of the present invention.

Figure 20:
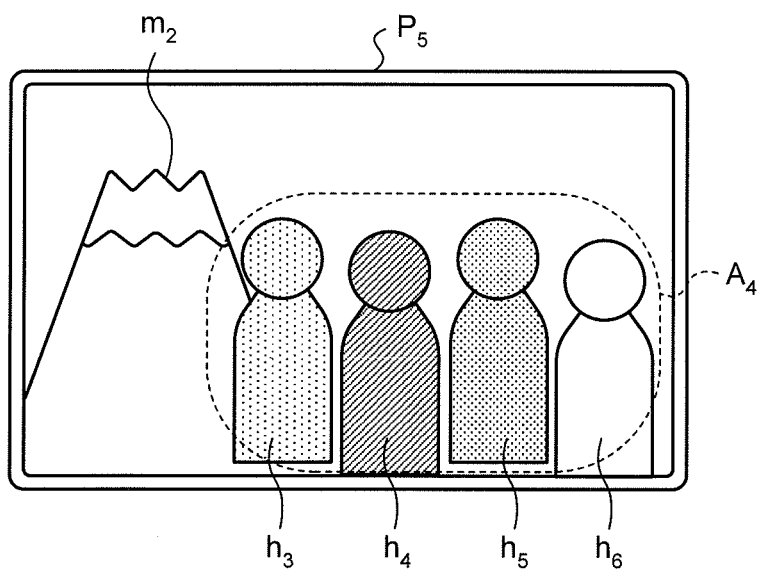
FIG. 20 is a view for explaining another example of the photographing operation of the mobile phone.

In the example, an image is acquired (photographed) when the face is moved into the frame $A_3$; however, the present invention is not limited thereto. For example, as illustrated in FIG. 20, a whole frame that a person enters is specified as a frame $A_4$, and furthermore, the number of people entering the frame is specified. In other words, in the present embodiment, the number of people is specified to be four. In this state, the mobile phone 1 may acquire an image when detecting that four faces are present in the frame $A_4$ as illustrated in FIG. 20. The mobile phone 1 may be configured to acquire an image without specification of the frame when the predetermined number of people in an image is satisfied.

Figure 21:
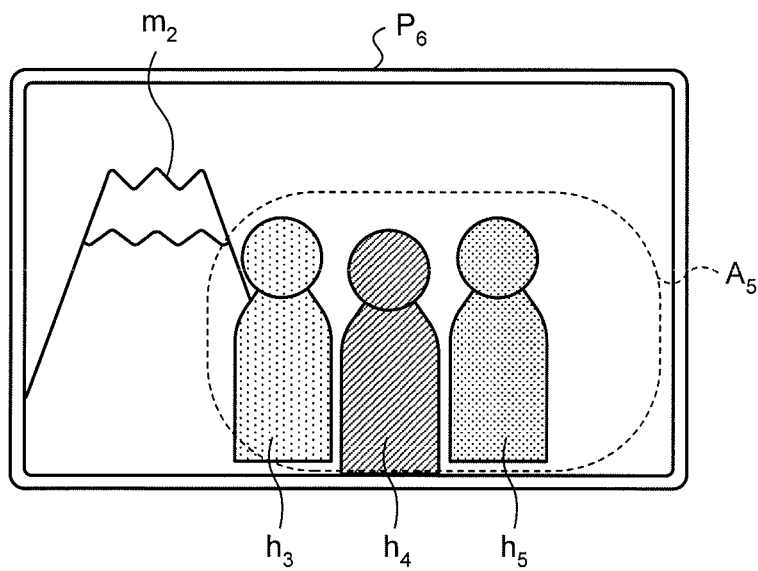
FIG. 21 is a view for explaining another example of the photographing operation of the mobile phone.
Figure 22:
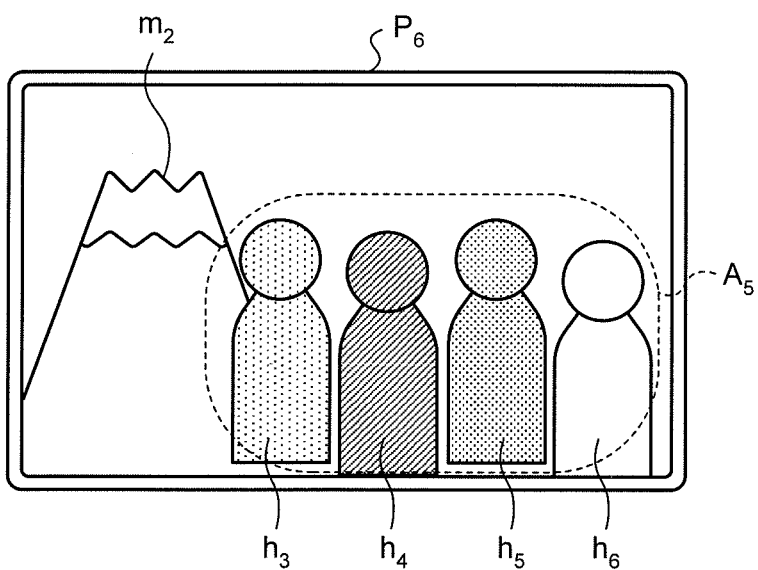
FIG. 22 is a view for explaining another example of the photographing operation of the mobile phone.

In the example, it is decided whether a region is specified to decide whether a person is present through a face recognition; however, it is also possible to decide whether the person is present by a person analyzing technique used in a monitoring camera or the like. FIGS. 21 and 22 are views for explaining another example of the photographing operation of the mobile phone. Since a configuration of the subjects according to the example illustrated in FIGS. 21 and 22 is the same as that of FIG. 17, description thereof will be omitted.

In the examples illustrated in FIGS. 21 and 22, an operator specifies a region and the number of people (four in the present example). When the region and the number of people are specified, the mobile phone 1 displays a frame $A_5$ as a preview image $P_6$ in the specified region as illustrated in FIG. 21. Moreover, the mobile phone 1 analyses the people of the image in the frame $A_5$ and detects the number of the people present in the frame. In the example illustrated in FIG. 21, it is detected that the number of people is three.

When the person $H_6$ further moves into the frame $A_5$ in this condition, there is brought a state in which four people are present in the frame $A_5$ for the preview image $P_6$ as illustrated in FIG. 22. When this state is brought and the mobile phone 1 detects that four people are present in the frame $A_5$, an image is acquired. By carrying out the person analysis, thus, it is possible to photograph an image through only a movement of a photographer or the like to a predetermined region.

Figure 23:
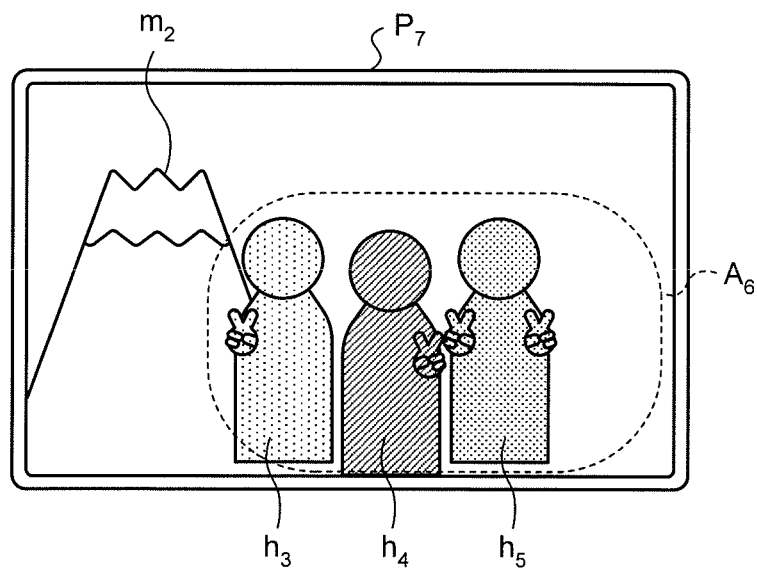
FIG. 23 is a view for explaining another example of the photographing operation of the mobile phone.
Figure 24:
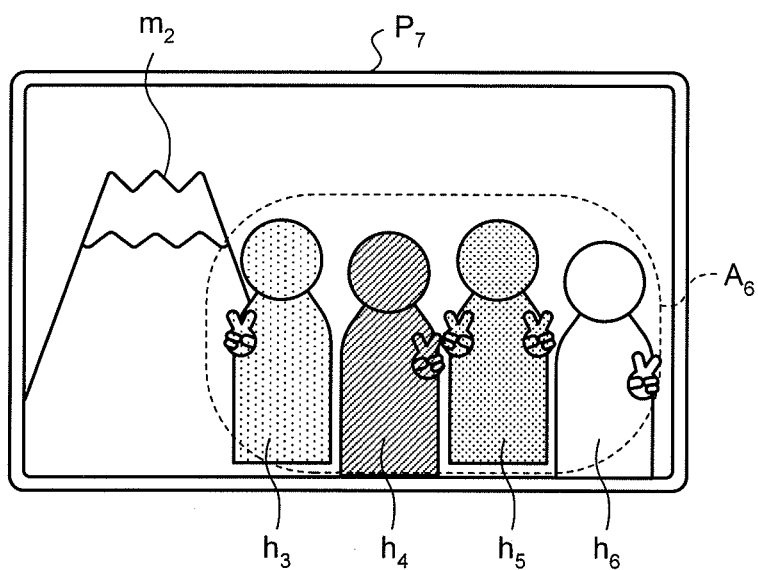
FIG. 24 is a view for explaining another example of the photographing operation of the mobile phone.

It is also possible to add a state of a person in the frame (a posture or a pose) as a condition for deciding whether the photographing operation is carried out or not. FIGS. 23 and 24 are views for explaining another example of the photographing operation of the mobile phone. Also in the example illustrated in FIGS. 23 and 24, a configuration of the subjects is the same as that in FIG. 17. Therefore, description thereof will be omitted.

In the example illustrated in FIGS. 23 and 24, an operator specifies a region and the number of people (four people in the present example), and furthermore, a posture of each of the people (a pose of "peace sign"). The mobile phone 1 displays a frame $A_6$ as a preview image $P_7$ in the specified region as illustrated in FIG. 23 when a region, the number of people, and a posture are specified. The mobile phone 1 analyzes an image in the frame $A_6$, and detects the people present in the frame and detects the number of the people and a posture of each of the people. In the example illustrated in FIG. 23, the number of the people is detected to be three and they are detected to take the pose of "peace".

When the person $H_6$ further moves into the frame $A_6$ in this condition, there is brought a state in which four people taking the pose of "peace" are present in the frame $A_6$ as the preview image $P_7$ as illustrated in FIG. 24. When this state is brought and the mobile phone 1 detects that four people are present in the frame $A_6$ and all of them take the pose of "peace", an image is acquired. By carrying out the image analysis, thus, it is possible to photograph an image through only a movement of a photographer or the like into a predetermined region to take a predetermined posture. By photographing an image in a state in which the predetermined posture is taken, it is possible to acquire an image in which the person to be the subject is taking an intended posture.

Figure 25:
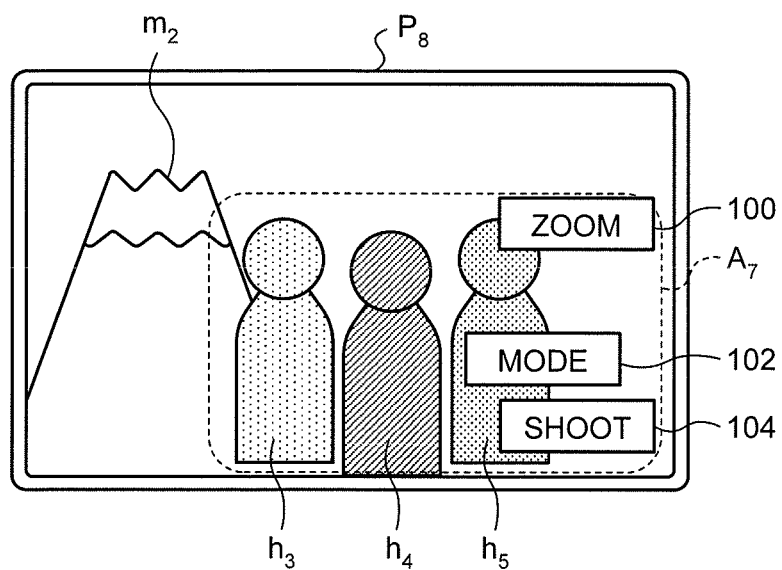
FIG. 25 is a view for explaining another example of the photographing operation of the mobile phone.
Figure 26:
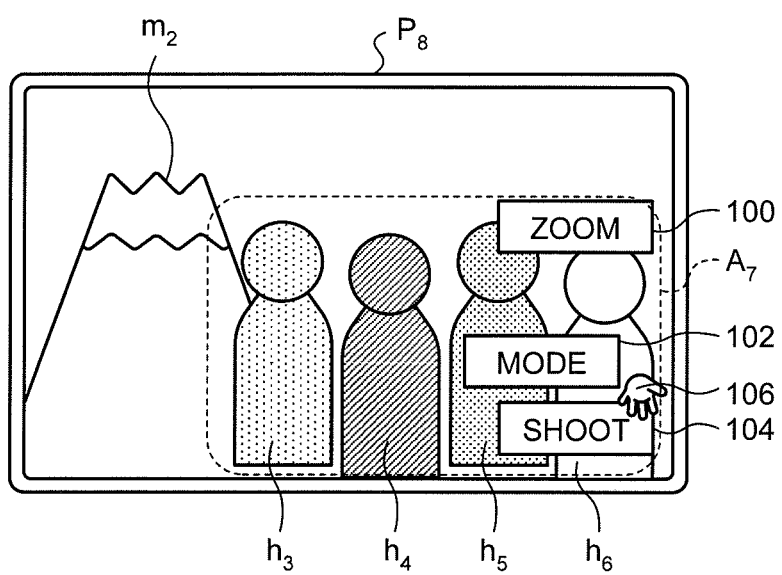
FIG. 26 is a view for explaining another example of the photographing operation of the mobile phone.

The mobile phone 1 may be configured to display an item of an operation related to the photographing operation on a preview image, and to carry out an operation for the item when detecting that a preset object is present in a region corresponding to a display position of the item. Description will be given with reference to FIGS. 25 and 26. FIGS. 25 and 26 are views for explaining another example of the photographing operation of the mobile phone, respectively. Referring to the example illustrated in FIGS. 25 and 26, similarly, a configuration of the subjects is the same as that in FIG. 17. Therefore, description thereof will be omitted. In the present example, a hand of a person $h_6$ is set as the preset object.

First of all, the mobile phone 1 displays a frame $A_7$, and three items, that is, an item 100, an item 102, and an item 104 which are disposed in the frame $A_7$ as a preview image $P_8$ in addition to an image acquired by the camera 36 as illustrated in FIG. 25. The item 100 is displayed as "ZOOM", the item 102 is displayed as "MODE" and the item 104 is displayed as "SHOOT". When the item is specified, the mobile phone 1 carries out a corresponding operation to the name which is displayed thereon. The "MODE" serves to change a photographing mode (night view, interior, landscape or the like). Moreover, the frame $A_7$ is a range that a person in a photographing position reaches by a hand.

In a state in which the preview image $P_8$ illustrated in FIG. 25 is displayed, the mobile phone 1 acquires an image when the person $H_6$ to be an operator moves into the frame $A_7$ and brings a hand 106 to a region corresponding to the item 104 so that the mobile phone 1 detects that the item 104 and the hand 106 overlap with each other over the preview image $P_8$ as illustrated in FIG. 26.

Also in the case in which the mobile phone 1 is caused to display an operation command on the preview image and to decide whether or not an object overlaps with the region thereof over the preview image, thus, the photographer to be the subject can photograph an image in an optional timing apart from the mobile phone 1. By displaying various items as the operation commands, the subject can carry out the operation displayed on the command through only a movement in a photographing region. Consequently, it is also possible to vary a magnification of a photographic image or a photographing mode.

In the example, the operator moves an object to a position corresponding to the item while seeing the preview image; however, the mobile phone 1 may be configured to photograph a part of the preview image by the camera 36 and to carry out the processing by detecting whether or not the object is moved onto the item displayed on the preview image. Description will be given with reference to FIGS. 27 to 30. FIGS. 27 to 30 are views for explaining another example of the photographing operation of the mobile phone. Also in the example illustrated in FIGS. 27 to 30, although a projection region and a processing of an image by the projector 34 are varied, the configuration of the subjects is the same as that in FIG. 17. In the present example, a foot of the person $h_6$ is set as the preset object.

Figure 27:
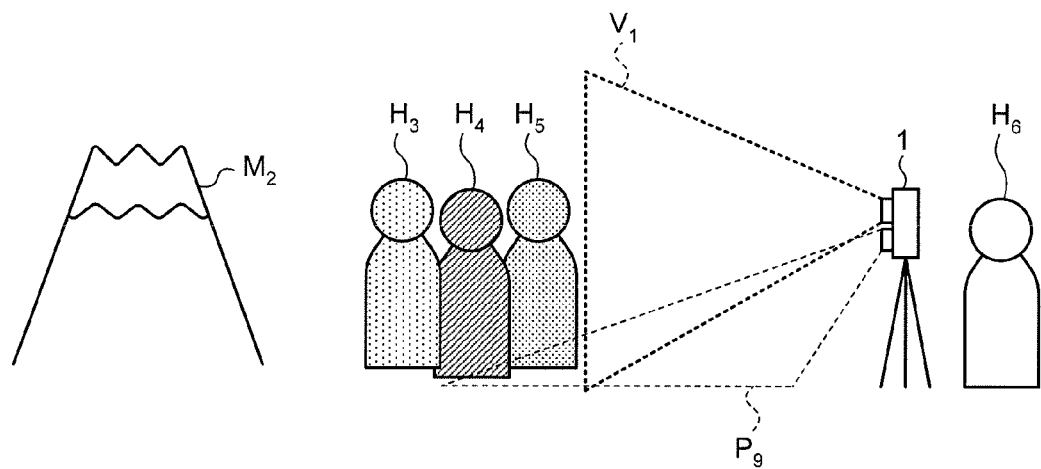
FIG. 27 is a view for explaining another example of the photographing operation of the mobile phone.

First of all, the projector 34 of the mobile phone 1 projects a preview image $P_9$ such that a portion of the preview image $P_9$ overlaps with a photographing region $V_1$, as illustrated in FIG. 27. Consequently, the mobile phone 1 can acquire an image of the portion of the preview image $P_9$ by means of the camera 36.

Figure 28:
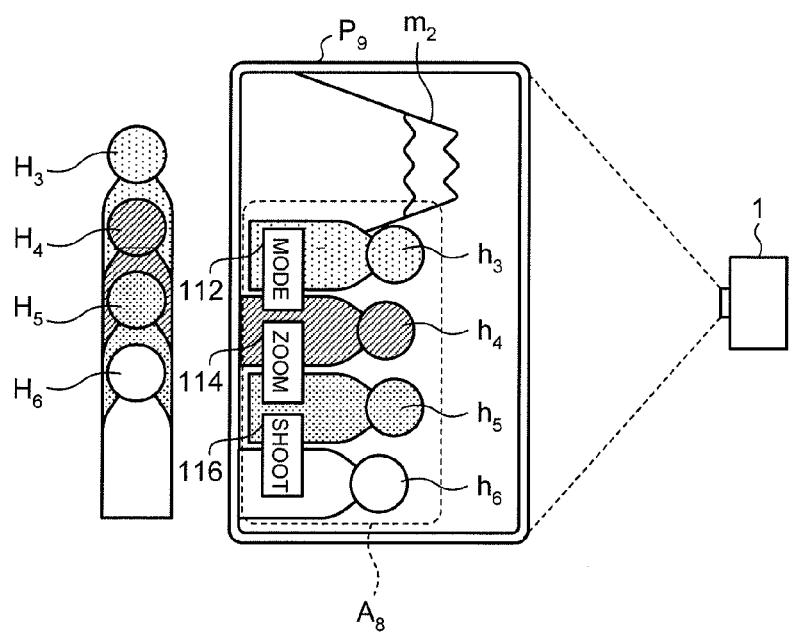
FIG. 28 is a view for explaining another example of the photographing operation of the mobile phone.

The mobile phone 1 displays a frame $A_8$ and three items, that is, an item 112, an item 114 and an item 116 which are disposed in the frame $A_8$ as a preview image $P_9$ in addition to the image acquired by the camera 36 as illustrated in a plan view of FIG. 28. The item 112 is displayed as "MODE", the item 114 is displayed as "ZOOM" and the item 116 is displayed as "SHOOT". When the item is specified, the mobile phone 1 carries out an operation corresponding to the name which is displayed thereon. Moreover, the projector 34 projects the preview image $P_9$ in such a manner that an upper side part of the image acquired by the camera 36 is disposed on the mobile phone 1 side and a lower side part of the image acquired by the camera 36 is disposed on the person side. Furthermore, each item is displayed in a region that the person reaches by a foot. A rate of an overlapping portion of the preview image $P_9$ and the photographing region $V_1$ to a whole part is set to be equal. Consequently, it is possible to prevent a photographed image from being shifted from a projected image. Moreover, a portion of an image in the photographing region $V_1$ which overlaps with the preview image $P_9$ does not need to be projected.

Figure 29:
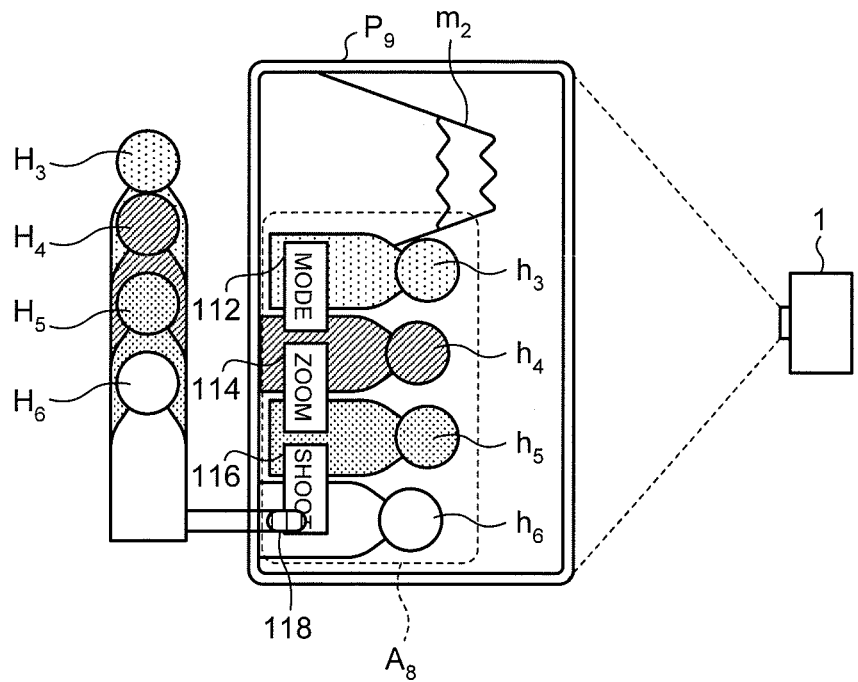
FIG. 29 is a view for explaining another example of the photographing operation of the mobile phone.
Figure 30:
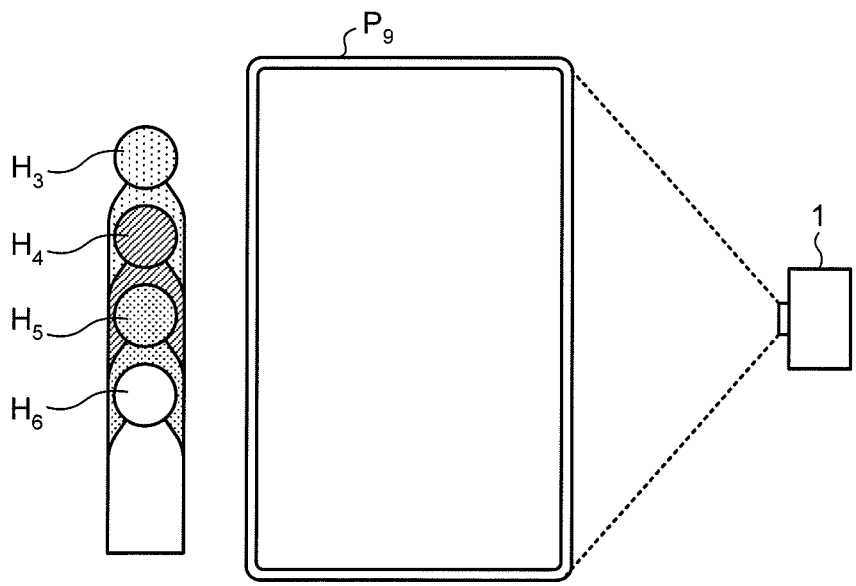
FIG. 30 is a view for explaining another example of the photographing operation of the mobile phone.

In this state, the person $H_6$ steps on the item 116 of the preview image $P_9$ by a foot 118 as illustrated in FIG. 29. When analyzing the image acquired by the camera 36 and detecting that the foot 118 steps on the item 116, the mobile phone 1 acquires (photographs) an image. The mobile phone 1 acquires the image after bringing a state in which no image is projected as the preview image $P_9$ through the projector 34 as illustrated in FIG. 30.

In the case in which the mobile phone 1 according to the present example is used, thus, the photographer can acquire an image by stepping on the image projected by the projector. In other words, it is possible to press down the shutter. In addition, it is possible to carry out an input to an image which is actually displayed. Therefore, an input position for an operation is easily understood and the operator can readily carry out the operation.

By acquiring an image through a camera after stopping the projection of the preview image, that is, in a state in which nothing is projected, the mobile phone 1 can prevent a preview image from being projected onto a photographed image. In addition, the mobile phone 1 can also prevent a light output from the projector from influencing the photographed image.

Any operation in the image photographing timing or the like is carried out while a preview image is displayed. Consequently, it is possible to make the processing easy, thereby acquiring an image desired by a user readily. Thus, it is preferable to make a use together with the display of the preview image. However, in the case in which a condition is previously input and an image is automatically photographed after a detection of the condition as in the examples illustrated in FIGS. 17 to 24, it is also possible to make the use without the display of the preview image.

In the description, the mobile phone 1 to be the portable photographing device has at least two modes, that is, the first projecting mode and the second projecting mode as an example; however, the portable photographing device according to the present embodiment is not limited to the mobile phone 1. For instance, the portable photographing device according to the present embodiment may have only the second projecting mode. Moreover, the projector 34 is not limited to a mechanism for scanning a laser beam by a mirror to project an image but it is also possible to use a mechanism which is provided with a shutter for each pixel of an image to be projected and opens/closes the shutter to project the image, for instance.

In the embodiment, the description has been given to the case in which a static image is acquired in the embodiment; however, the present invention may be used in the case in which a moving image is acquired. Furthermore, each example of an input for the image acquisition (the timing for pressing down the shutter) can be used for inputting an instruction for starting or ending a photographing operation in the case in which a moving image is acquired. Although the description has been given to the mobile phone in the embodiment, the present invention can also be used in a digital camera having a projector function and a digital video camera having a projector function which do not have a wireless communication function.

INDUSTRIAL APPLICABILITY

As described above, the portable photographing device according to the present invention is useful for the case in which an image including a photographer himself/herself is photographed.

The invention claimed is:

1. A portable photographing device, comprising:
an image capturing unit;
a projecting unit; and
a storing unit, wherein
the projecting unit is configured to project a projection image into a region which is different from an image capturing region of the photographing unit,
the projection image is any of
a first image captured by the image capturing unit,
a second image related to the first image, and
a third image obtained by synthesizing the first image with the second image,
the storing unit is configured to store
the first image captured during the projection of the projection image, or
the first image captured after the projection of the projection image has ended, and
the portable photographing device further comprises:
a display unit configured to display an identical image to the projection image; and
an operating unit configured to receive an user operation for specifying a position in the image displayed on the display unit,
wherein the second image is an image indicative of the position which is specified by the user operation.

2. The portable photographing device according to claim 1, wherein
the projecting unit is configured to project the projection image into a region in which the projection image is visually recognizable from the image capturing region by a person to be photographed by the image capturing unit.

3. The portable photographing device according to claim 1, wherein
the second image indicates a position in the image capturing region for a person to be photographed by the image capturing unit.

4. The portable photographing device according to claim 1, wherein
the second image includes an image indicative of information related to a control of the image capturing unit.

5. A portable photographing device, comprising:
an image capturing unit;
a projecting unit; and
a storing unit, wherein
the projecting unit is configured to project a projection image into a region which is different from an image capturing region of the photographing unit,
the projection image is any of
a first image captured by the image capturing unit,
a second image related to the first image, and
a third image obtained by synthesizing the first image with the second image,
the storing unit is configured to store
the first image captured during the projection of the projection image, or
the first image captured after the projection of the projection image has ended, and
the storing unit is configured to store
the first image captured upon a determination that at least one of (i) a number of subjects to be photographed in the image capturing region, (ii) an operation performed by a subject to be photographed in the image capturing region, and (iii) a position of a subject to be photographed in the image capturing region, satisfies a preset condition, or
the first image captured when a predetermined time period has lapsed since said determination.

6. The portable photographing device according to claim 1, wherein
the storing unit is configured to store
the first image captured upon a determination that a relationship between (i) a person to be photographed in the image capturing region and (ii) the position specified by the user operation, satisfies a preset condition, or
the first image captured when a predetermined time period has lapsed since said determination.

7. A portable photographing device, comprising:
an image capturing unit;
a projecting unit; and
a storing unit, wherein
the projecting unit is configured to project a projection image into a region which is different from an image capturing region of the photographing unit,
the projection image is any of
a first image captured by the image capturing unit,
a second image related to the first image, and
a third image obtained by synthesizing the first image with the second image,
the storing unit is configured to store
the first image captured during the projection of the projection image, or
the first image captured after the projection of the projection image has ended,
the projecting unit is configured to project the projection image into a position in which a portion of the projection image overlaps with the image capturing region, and
in response to a determination that (i) a number of subjects to be photographed in the image capturing region, (ii) an operation performed by a subject to be photographed in the image capturing region, or (iii) a position of a subject to be photographed in the image capturing region, satisfies a preset condition in an overlapping region in which the projection image overlaps with the image capturing region,
the projecting unit is configured to stop the projection of the projection image, and
the storing unit is configured to store
(a) the first image captured at a time the projection of the projection image is stopped, or
(b) the first image captured when a predetermined time period has lapsed since said time.

8. The portable photographing device according to claim 7, wherein
the overlapping region is provided under the subject or in the vicinity thereof.

9. The portable photographing device according to claim 7, wherein
the second image includes, in the overlapping region, a mark for giving an instruction related to an image captured by the image capturing unit, and
in response to a detection that a preset operation is carried out for the mark by a person to be photographed in the image capturing region, the storing unit is configured to store
the first image acquired at said detection of the preset operation, or
the first image acquired when a predetermined time period has lapsed since said detection.

10. A portable photographing device, comprising:
an image capturing unit;
a projecting unit; and
a storing unit, wherein
the projecting unit is configured to project a projection image into a region which is different from an image capturing region of the photographing unit,
the projection image is an image obtained by synthesizing an image captured by the image capturing unit and a prestored image, and
the storing unit is configured to store the projection image.

* * * * *